United States Patent
Li

(10) Patent No.: US 9,229,204 B2
(45) Date of Patent: Jan. 5, 2016

(54) ZOOM LENS

(75) Inventor: Dayong Li, Saitama (JP)

(73) Assignee: TAMRON CO., LTD., Saitama-shi (JP)

( * ) Notice: Subject to any disclaimer, the term of this patent is extended or adjusted under 35 U.S.C. 154(b) by 673 days.

(21) Appl. No.: 13/544,158

(22) Filed: Jul. 9, 2012

(65) Prior Publication Data
US 2013/0050827 A1    Feb. 28, 2013

(30) Foreign Application Priority Data

Aug. 24, 2011  (JP) .................. 2011-183026

(51) Int. Cl.
G02B 15/177    (2006.01)
G02B 27/64     (2006.01)

(52) U.S. Cl.
CPC ............ *G02B 15/177* (2013.01); *G02B 27/646* (2013.01)

(58) Field of Classification Search
None
See application file for complete search history.

(56) References Cited

U.S. PATENT DOCUMENTS

| 6,147,812 | A  | 11/2000 | Narimatsu et al. |
| 6,154,322 | A  | 11/2000 | Nakayama |
| 2001/0036020 | A1 | 11/2001 | Yamamoto |
| 2005/0248855 | A1 | 11/2005 | Ito |
| 2005/0286139 | A1 | 12/2005 | Nishimura |
| 2006/0221461 | A1 | 10/2006 | Shibayama |
| 2009/0201590 | A1 | 8/2009 | Sugita |
| 2011/0116172 | A1 | 5/2011 | Yamagami et al. |
| 2012/0019925 | A1 | 1/2012 | Kurioka et al. |

FOREIGN PATENT DOCUMENTS

| CN | 102062934 |   | 5/2011 |
| JP | 11-305125 | A | 11/1999 |
| JP | 2000-171703 | A | 6/2000 |
| JP | 2001-343587 | A | 12/2001 |
| JP | 3391883 | B2 | 1/2003 |
| JP | 2005-321561 | A | 11/2005 |
| JP | 2006-039531 | A | 2/2006 |
| JP | 2006-276452 | A | 10/2006 |
| JP | 2007-094174 | A | 4/2007 |

(Continued)

OTHER PUBLICATIONS

Japanese Office Action, Dec. 2, 2014, 9 pages.

(Continued)

*Primary Examiner* — Derek S Chapel
(74) *Attorney, Agent, or Firm* — Foley & Lardner LLP

(57) ABSTRACT

A zoom lens includes sequentially from an object side, a first lens section $G_{11}$ having a negative refractive power and a second lens section $G_{12}$ having a positive refractive power. The first lens section $G_{11}$ includes sequentially from the object side, a negative lens $L_{111}$, a negative lens $L_{112}$, and a positive lens $L_{113}$. Both surface of the negative lens $L_{112}$ are aspheric. The second lens section $G_{12}$ includes sequentially from the object side, a front group $G_{12F}$ having a positive refractive power and a rear group $G_{12R}$ having a positive refractive power. Both surfaces of a negative lens $L_{126}$ included in the rear group $G_{12R}$ are aspheric. The zoom lens can maintain high imaging performance while achieving size reductions and wide angle views by satisfying given conditions.

8 Claims, 14 Drawing Sheets

(56) References Cited

FOREIGN PATENT DOCUMENTS

| | | |
|---|---|---|
| JP | 2009-192599 A | 8/2009 |
| JP | 2012-042927 A | 3/2012 |
| JP | 2012-123124 A | 6/2012 |
| JP | 2012-173420 A | 9/2012 |

OTHER PUBLICATIONS

Chinese Office Action, May 6, 2014, 12 pages.

FIG.4

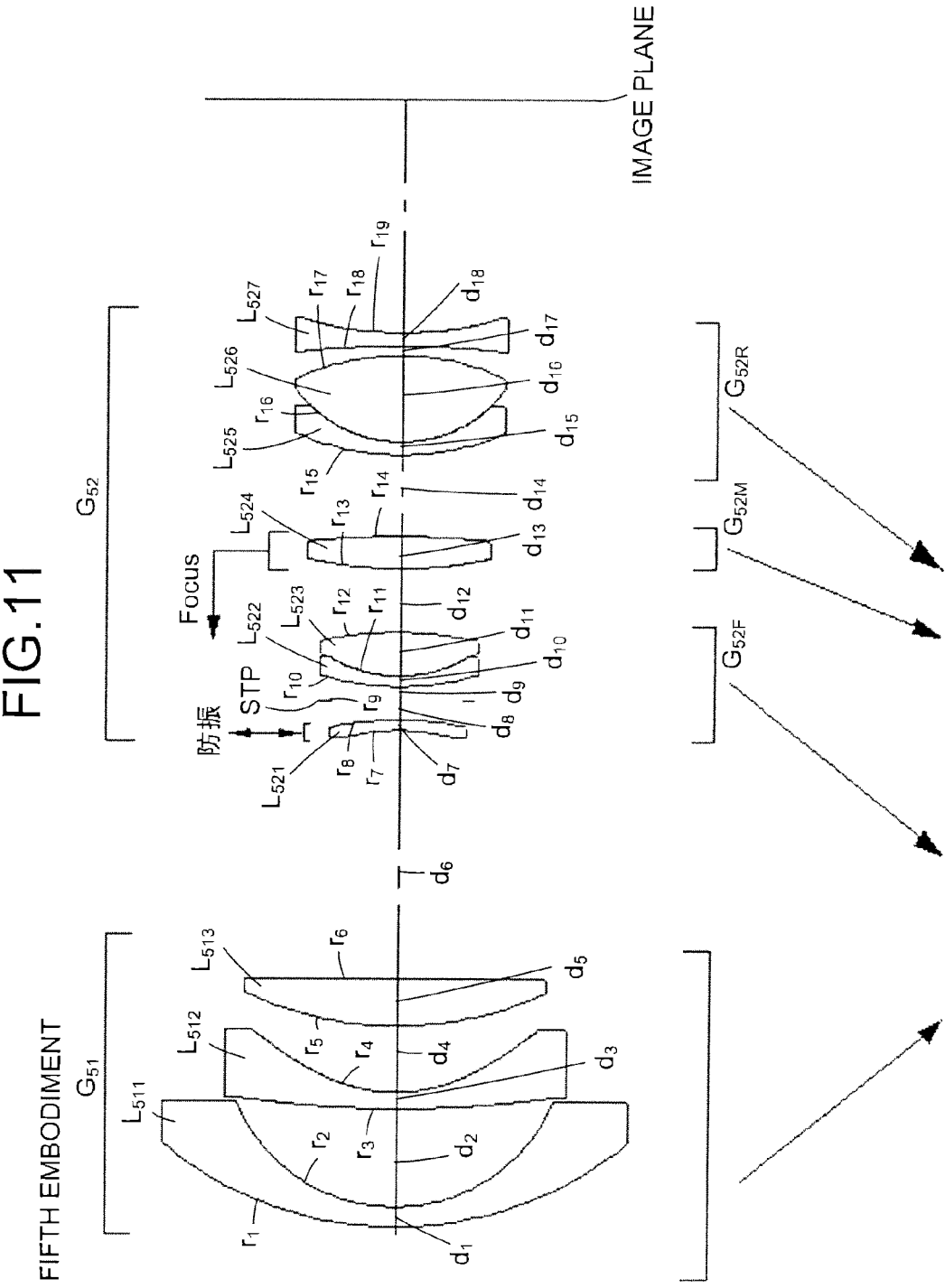

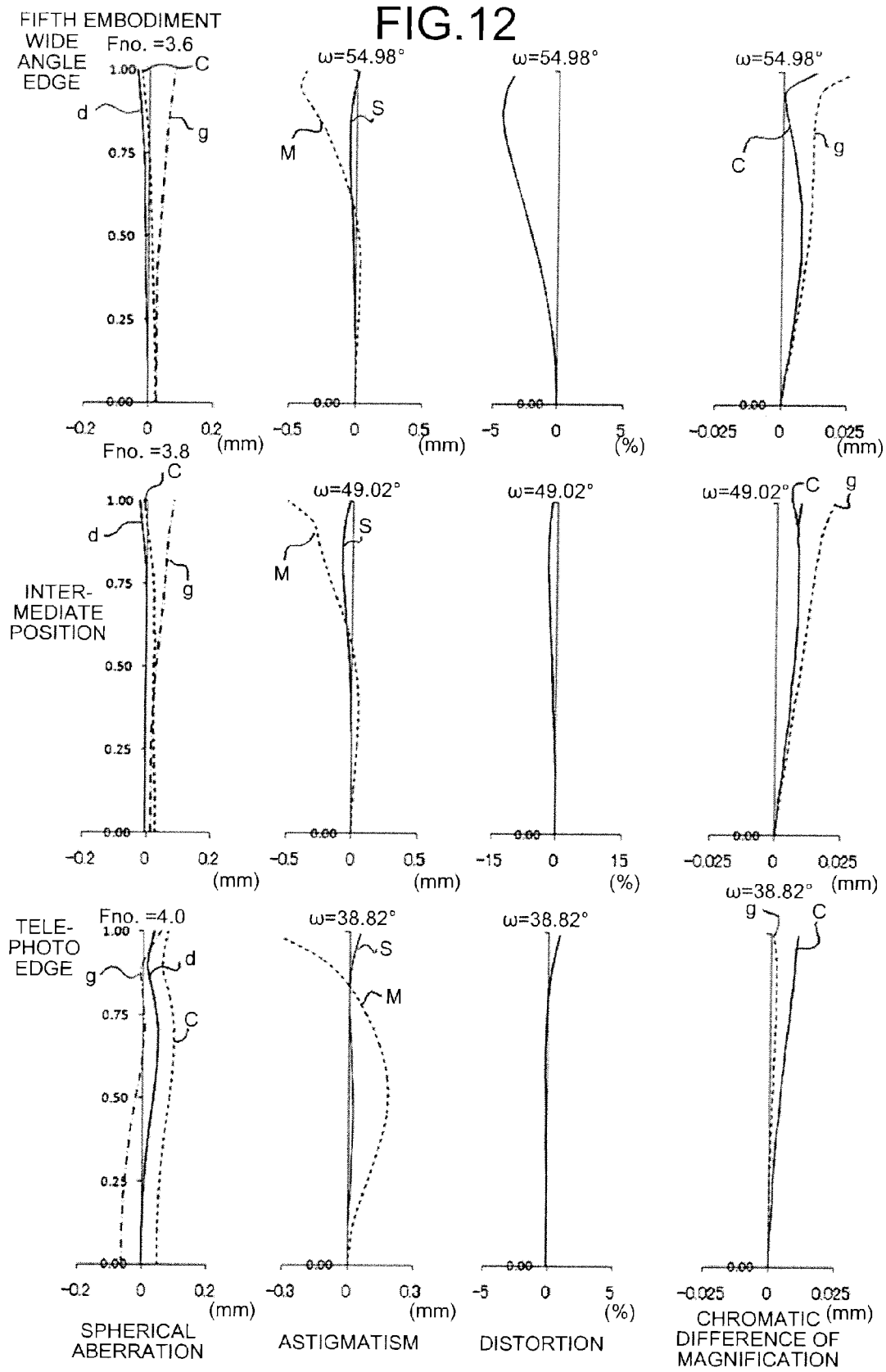

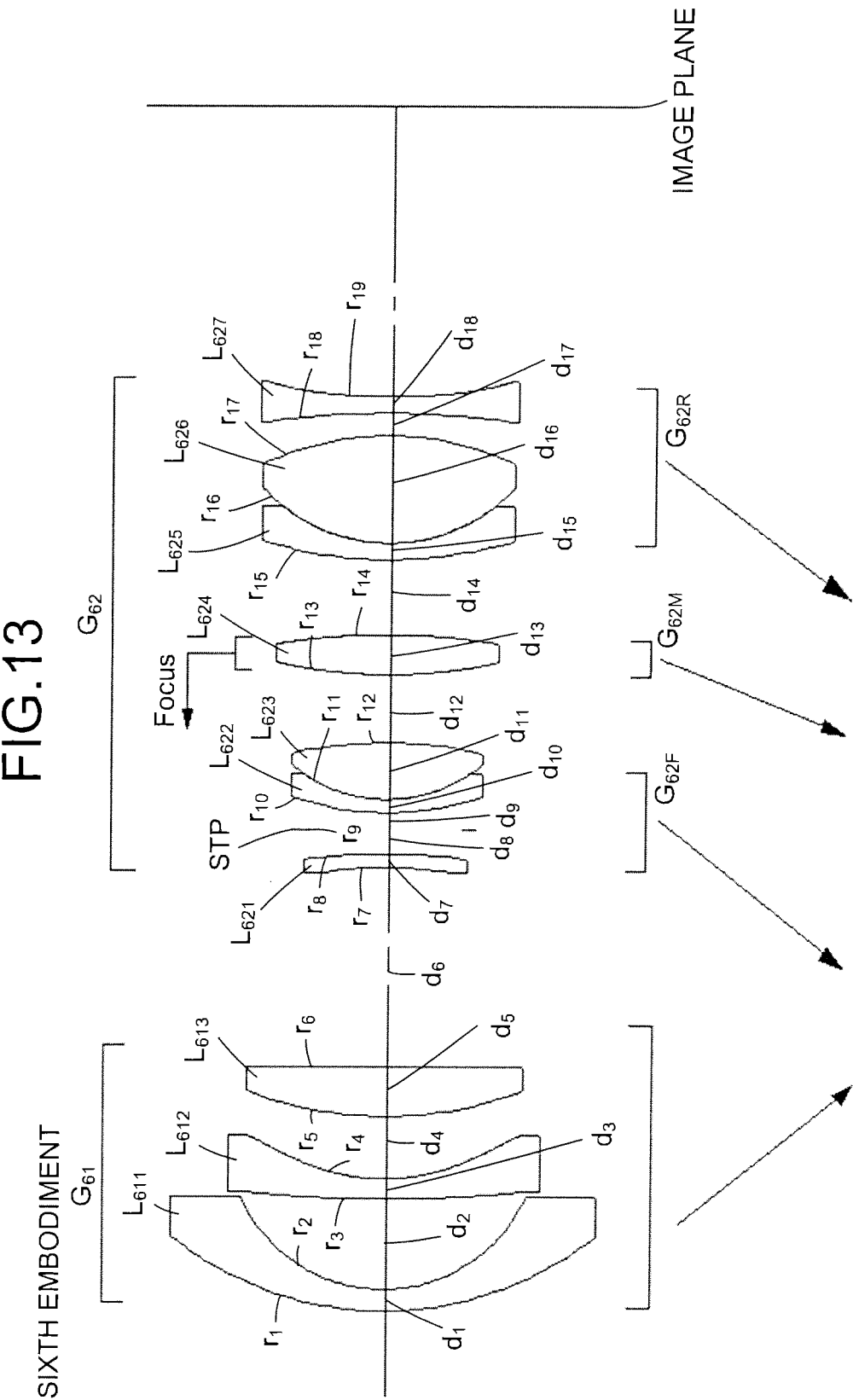

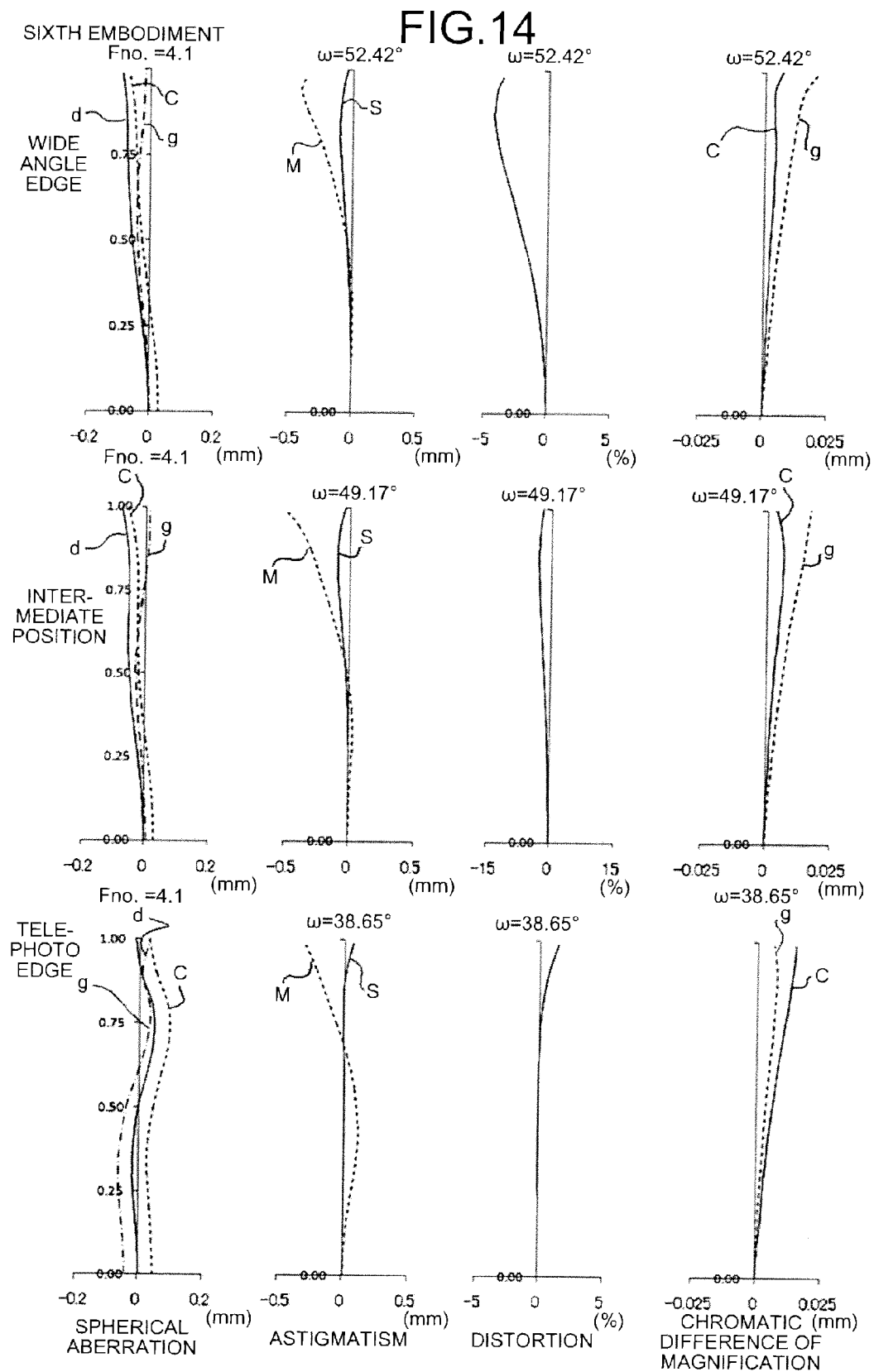

ZOOM LENS

BACKGROUND OF THE INVENTION

1. Field of the Invention

The present invention relates to a compact wide angle zoom lens.

2. Description of the Related Art

As a wide angle zoom lens widely used on single-lens reflex cameras, a 4-group zoom lens includes sequentially from an object side, lens groups having negative, positive, negative, and positive refractive powers, respectively (see, for example, Japanese Patent Laid-Open Publication Nos. 2006-276452 and 2006-39531, and Japanese Patent No. 3391883).

The zoom lenses recited in Japanese Patent Laid-Open Publication Nos. 2006-276452 and 2006-39531, and Japanese Patent No. 3391883 respectively include sequentially from the object side, lens groups having negative, positive, negative, and positive refractive powers, respectively and are capable of 1.5× or greater zoom. The zoom lens recited in Japanese Patent Laid-Open Publication No. 2006-276452, secures an angle of view on the order of 80 degrees at the wide angle edge, and is capable of 2.8× zoom. The zoom lens recited in Japanese Patent Laid-Open Publication No. 2006-39531, secures an angle of view on the order of 105.8 degrees at the wide angle edge, and is capable of 1.95× to 2.36× zoom. The zoom lens recited in Japanese Patent No. 3391883 secures an angle of view on the order of 99 degrees at the wide angle edge, and is capable 1.85× zooming.

As with the zoom lenses recited in Japanese Patent Laid-Open Publication Nos. 2006-276452 and 2006-39531, and Japanese Patent No. 3391883, conventional wide angle zoom lenses, in general, have aspheric surfaces formed on multiple surfaces of the lenses configuring a first lens group, to achieve both correction of prominent aberration consequent to increasing the angle of view at the wide angle edge and a reduction of the size of the first lens group. In particular, a large-diameter, aspheric glass lens is employed for the lens disposed farthest on the object side of the zoom lens.

In the zoom lens recited in Japanese Patent Laid-Open Publication No. 2006-276452, an aspheric lens having a strong negative refractive power is disposed farthest on the object side of the zoom lens, and the zoom lens suppresses the effective diameter of the front frame and secures high imaging performance at wide angles. However, this zoom lens has a narrow angle of view on the order of 80 degrees at the wide angle edge and meeting demands for a wider angle of view is difficult. In addition, since the glass lens disposed farthest on the object side is aspheric, a problem of extremely high manufacturing cost arises.

The zoom lenses recited in Japanese Patent Laid-Open Publication No. 2006-39531 and Japanese Patent No. 3391883, both have an aspheric lens of a strong negative refractive power disposed farthest on the object side and are designed to achieve both an ultra wide angle and reduction of the front frame. Although these zoom lenses both have angles of view on the order of 100 degrees at the wide angle edge and are designed to achieve sufficiently wide angles, the first lens group is large and thus, are not suitable for imaging apparatuses of which compactness is strongly demanded of late. In addition, since the glass lens disposed farthest on the object side of the zoom lens is aspheric, a problem of extremely high manufacturing cost further arises.

SUMMARY OF THE INVENTION

It is an object of the present invention to at least solve the above problems in the conventional technologies.

A zoom lens according to one aspect of the present invention includes sequentially from an object side, a first lens section having a negative refractive power, and a second lens section formed by multiple lens groups and having an overall refractive power that is positive. The first lens section is configured by multiple lenses including sequentially from the object side, a first lens that is a spherical lens having a negative refractive power and a second lens that is an aspheric lens having a negative refractive power. The second lens section is configured to include at least 1 aspheric lens having a negative refractive power. Zooming from a wide angle edge to a telephoto edge is performed by varying an interval between the first lens section and the second lens section, or an interval between the first lens section and the second lens section and intervals between the lens groups configuring the second lens section. Focusing from infinity to a minimum object distance is performed by moving any 1 of the lens groups configuring the second lens section. A conditional expression (1) $-8.0 \leq F12/D23 \leq -1.0$ is satisfied, where, F12 is a focal length of the second lens, and with respect to the first lens section, D23 is a distance between an image-side surface of the second lens and an object-side surface of a lens disposed nearest an image plane, among the lenses configuring the first lens section.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is a diagram of various types of aberration occurring in the zoom lens according to the first embodiment;

FIG. 11 is a cross sectional view (along the optical axis) of the zoom lens according to a fifth embodiment;

FIG. 12 is a diagram of various types of aberration occurring in the zoom lens according to the fifth embodiment;

FIG. 13 is a cross sectional view (along the optical axis) of the zoom lens according to a sixth embodiment; and FIG. 14 is a diagram of various types of aberration occurring in the zoom lens according to the sixth embodiment.

DETAILED DESCRIPTION OF THE PREFERRED EMBODIMENTS

Figure 1:
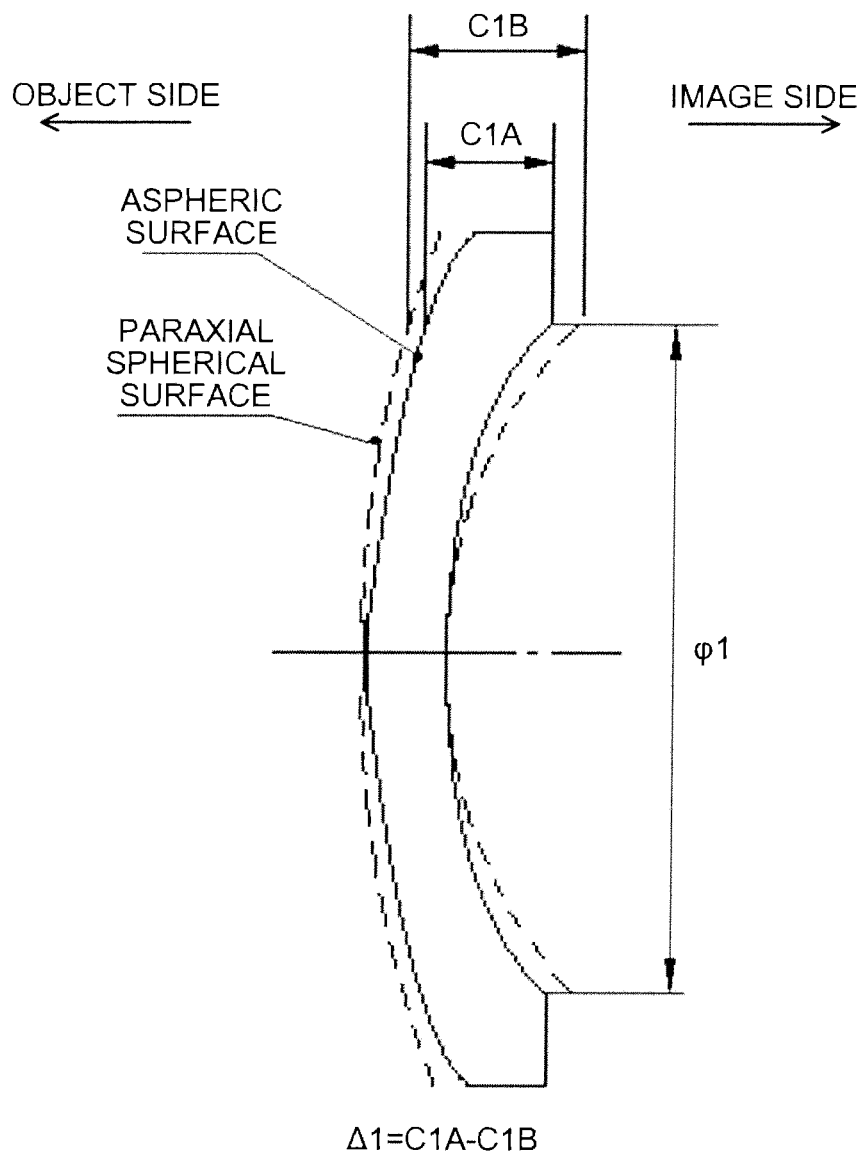
FIG. 1 is a diagram depicting one example of the shape of a second lens included in a first lens section.

With reference to the accompanying drawings, preferred embodiments of a zoom lens according to the present invention are explained in detail below.

The zoom lens according to the present invention includes sequentially from the object side, a first lens section having a negative refractive power and a second lens section formed by multiple lens groups and having an overall refractive power that is positive. The first lens section is configured by multiple lenses, including sequentially from the object side, a first lens that is a spherical lens having a negative refractive power and a second lens that is an aspheric lens having a negative refractive power. The second lens section is configured to include at least 1 aspheric lens having a negative refractive power.

Thus, a low cost spherical lens is disposed farthest on the object side of the zoom lens, and by forming lenses of small diameters (not the large diameter lens disposed farthest on the object side) to be aspheric, lens processing becomes relatively simple, enabling the manufacturing cost of the optical system to be reduced.

The zoom lens according to the present invention zooms from a wide angle edge to a telephoto edge by varying the interval between the first lens section and the second lens section, or the interval between the first lens section and the second lens section and the intervals between the lens groups configuring the second lens section. Further, by moving any 1 of the lens groups configuring the second lens section, focusing from infinity to the minimum object distance is performed.

By zooming and focusing via such lens movements, aberration fluctuations occurring during zooming and focusing can be suppressed.

An object of the present invention is to provide an angle of view that exceeds 100 degrees, while realizing size reductions with respect to a diameter dimension of the optical system. Another object of the present invention is to reduce the manufacturing cost of the optical system. To achieve objects of the present invention, various conditions such as the following are set.

The zoom lens according to the present invention preferably satisfies the following conditional expression where, $F12$ is the focal length of the second lens included in the first lens section; and with respect to the first lens section, $D33$ is the distance between an image-side surface of the second lens (the surface facing toward the image plane) and an object-side surface of the lens disposed nearest the image plane, among the lenses of the first lens section (the surface facing toward the object).

$$-8.0 \leq F12/D23 \leq -1.0 \quad (1)$$

Conditional expression (1) represents a condition for maintaining good imaging performance on top of achieving both size reductions of the optical system and wide angles. Satisfaction of conditional expression (1) enables an ultra wide angle exceeding 100 degrees to be achieved as well as size reductions with respect to a diameter dimension of the first lens section and maintenance of good imaging performance. Below the lower limit of conditional expression (1), the negative power of the second lens becomes too weak, and to achieve both the breadth of the angle of view at the wide angle edge and size reductions of the first lens section, the negative power of the first lens has to be increased. If the negative power of the first lens is increased, various types of aberration occurring at the first lens become prominent and therefore, an aspheric surface has to be formed on the first lens. As described, since the first lens has the largest diameter in the optical system, formation of an aspheric surface on the first lens bounces back to the issue of manufacturing cost and thus, has to be avoided. Meanwhile, above the upper limit of conditional expression (1), the negative power of the second lens becomes too strong and even if an aspheric surface is formed on the second lens, various types of aberration occurring at the second lens cannot be corrected; or within the first lens section, the interval between the second lens and the lens disposed opposing the image-side surface of the second lens becomes too short, the balance of power within the first lens section is lost and maintenance of good imaging performance may be jeopardized. Neither case is desirable.

If conditional expression (1) is within the following range, more favorable results can be expected.

$$-6.5 \leq F12/D23 \leq -1.4 \quad (1)'$$

Satisfaction of conditional expression (1)' enables further improvement in size reductions of the optical system, wide angle views, and imaging performance.

If conditional expression (1)' is within the following range, yet more favorable results can be expected.

$$-5.0 \leq F12/D23 \leq -1.8 \quad (1)''$$

Satisfaction of conditional expression (1)" enables yet further improvement in size reductions of the optical system, wide angle views, and imaging performance.

The zoom lens according to the present invention preferably satisfies the following conditional expression, where Fw is the focal length of the optical system overall at the wide angle edge.

$$-20.0 \leq (Fw \times F12)/(D23)^2 \leq -1.0 \quad (2)$$

Conditional expression (2) also represents a condition for maintaining good imaging performance on top of achieving both size reductions of the optical system and wide angle views. In addition to conditional expression (1), satisfaction of conditional expression (2), enables more favorable results to be expected. Below the lower limit of conditional expression (2), the negative power of the second lens becomes too weak, and to achieve both the breadth of the angle of view at the wide angle edge and size reductions of the first lens section, the negative power of the first lens has to be increased. If the negative power of the first lens is increased, various types of aberration occurring at the first lens become prominent and therefore, an aspheric surface has to be formed on the first lens. As described, since the first lens has the largest diameter in the optical system, formation of an aspheric surface on the first lens bounces back to the issue of manufacturing cost and thus, has to be avoided. Meanwhile, above the upper limit of conditional expression (2), the negative power of the second lens become too strong and even if an aspheric surface is formed on the second lens, various types of aberration occurring at the second lens cannot be corrected; or within the first lens section, the interval between the second lens and the lens disposed opposing the image-side surface of the second lens becomes too short, the balance of power within the first lens section is lost and maintenance of good imaging performance may become jeopardized. Neither case is desirable.

If conditional expression (2) is within the following range, more favorable results can be expected.

$$-18.0 \leq (Fw \times F12)/(D23)^2 \leq -1.5 \quad (2)'$$

Satisfaction of conditional expression (2)' enables further improvement in size reductions of the optical system, wide angle views, and imaging performance.

If conditional expression (2)' is within the following range, yet more favorable results can be expected.

$$-15.0 \leq (Fw \times F12)/(D23)^2 \leq -2.5 \quad (2)''$$

Satisfaction of conditional expression (2)" enables yet further improvement in size reductions of the optical system, wide angle views, and imaging performance.

The zoom lens according to the present invention preferably satisfies the following conditional expression where, as depicted in FIG. 1, φ1 is the maximum effective diameter of the image-side surface of the second lens, and Δ1(Δ1=C1A−C1B) is the difference of the perimeter edge of aspheric surface C1A and a perimeter edge of paraxial spherical surface C1B, on a perimeter of an area demarcated by the maximum effective diameter φ of the image-side surface of the second lens.

$$2.5 \leq |100 \times \Delta 1/\phi 1| \leq 10.0 \quad (3)$$

Conditional expression (3) represents a condition for realizing an optical system of low cost and having good imaging performance. Below the lower limit of conditional expression (3), favorable aberration correction becomes impossible and an aspheric surface has to be formed on the first lens, even if an aspheric surface is formed on the second lens included in the first lens section. As described, since the first lens has the largest diameter in the optical system, if an aspheric surface is formed on the first lens, processing becomes more difficult and manufacturing cost increases. Meanwhile, above the upper limit of conditional expression (3), peripheral image height aberration is over corrected by the aspheric surface formed on the second lens, inviting deterioration of imaging performance.

If conditional expression (3) is within the following range, more favorable results can be expected.

$$2.9 \leq |100 \times \Delta 1/\phi 1| \leq 9.0 \quad (3)'$$

Satisfaction of conditional expression (3)' enables realization of an optical system that is low cost and has good imaging performance.

If conditional expression (3)' is within the following range, yet more favorable results can be expected.

$$3.3 \leq |100 \times \Delta 1/\phi 1| \leq 8.0 \quad (3)''$$

Satisfaction of conditional expression (3)" enables an optical system that is low cost and has yet better imaging performance to be realized.

Figure 2:
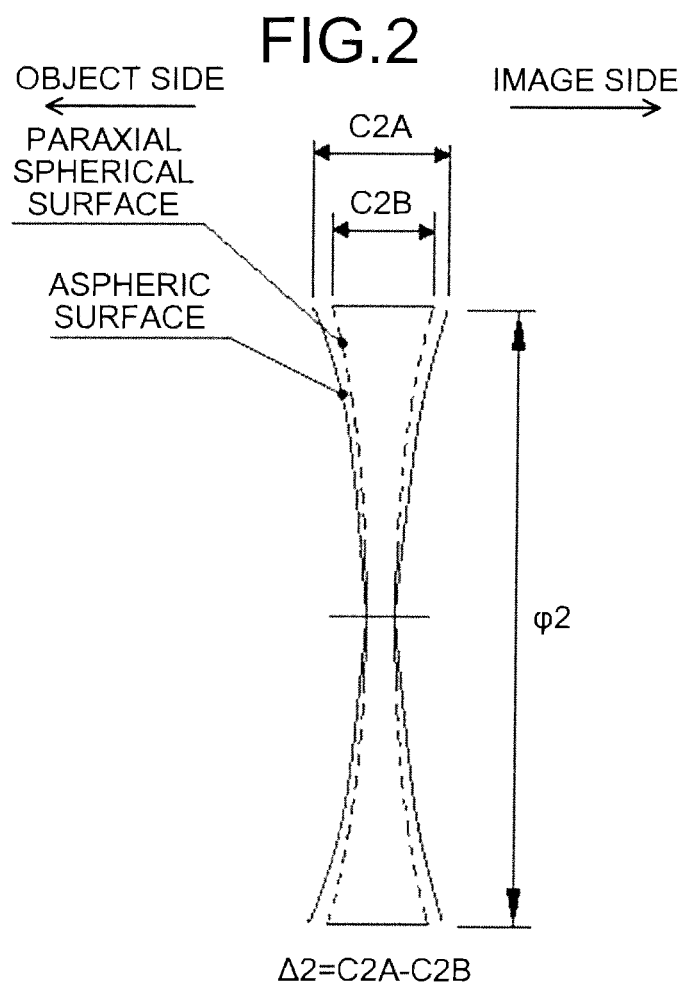
FIG. 2 is a diagram depicting one example of the shape of an aspheric lens included in a second lens section and having a negative refractive power.

The zoom lens according to the present invention preferably satisfies the conditional expression below, where, as depicted in FIG. 2, φ2 is the maximum effective diameter of the image-side surface of the negative aspheric lens included in the second lens section, and Δ2 (Δ2=C2A−C2B) is the difference of the perimeter edge of aspheric surface C2A and the perimeter edge of paraxial spherical surface C2B, on the perimeter of an area demarcated by the maximum effective diameter φ2 of the image-side surface of the negative aspheric lens included in the second lens section.

$$3.0 \leq |100 \times |(\Delta 1/\phi 1) - (\Delta 2/\phi 2)| \leq 12.0 \quad (4)$$

Conditional expression (4) represents a condition for realizing an optical system having excellent imaging performance. Below the lower limit of conditional expression (4), the aberration correction effect of the second lens of the first lens section and the aspheric lens included in the second lens section becomes too weak, inviting deterioration of imaging performance. Meanwhile, above the upper limit of conditional expression (4), aberration correction of the second lens of the first lens section and the aspheric lens included in the second lens section becomes excessive, causing imaging performance to deteriorate.

If conditional expression (4) is within the following range, more favorable results can be expected.

$$3.8 \leq 100 \times |(\Delta 1/\phi 1) - (\Delta 2/\phi 2)| \leq 11.0 \quad (4)'$$

Satisfaction of conditional expression (4)' enables further improvement of the imaging performance of the optical system.

If conditional expression (4)' is within the following range, yet more favorable results can be expected.

$$4.5 \leq 100 \times |(\Delta 1/\phi 1) - (\Delta 2/\phi 2)| \leq 10.0 \quad (4)''$$

Satisfaction of conditional expression (4)" enables yet further improvement of the imaging performance of the optical system.

In the zoom lens according to the present invention, the second lens section includes sequentially from the object side, a front group having a positive refractive power and a rear group having a positive refractive power, where the front group is moved in a direction along the optical axis to perform focusing from infinity to the minimum object distance. By such a configuration, aberration fluctuations consequent to focusing can be suppressed and a zoom lens having excellent imaging performance can be realized.

Further in the zoom lens according to the present invention, the second lens section may include sequentially from the object side, a front group having a positive refractive power, an intermediate group having a positive refractive power, and a rear group having a positive or a negative refractive power, where the intermediate group is moved in a direction along the optical axis to perform focusing from infinity to the minimum object distance. By this configuration as well, aberration fluctuations consequent to focusing can be suppressed and a zoom lens having excellent imaging performance can be realized.

Additionally in the zoom lens according to the present invention, the second lens section may include sequentially from the object side, a front group having a positive refractive power, an intermediate group having a positive refractive power, and a rear group having a positive or a negative refractive power, where the intermediate group is moved in a direction along the optical axis to perform focusing from infinity to the minimum object distance, and a lens included in the front group can be moved in a direction substantially orthogonal to the optical axis to correct camera-shake (image point vibration). By such a configuration, aberration fluctuations consequent to focusing can be suppressed and a zoom lens having excellent imaging performance can be realized. In addition, the zoom lens can be realized having a camera-shake correction function.

In the zoom lens according to the present invention, in particular, the first lens section includes sequentially from the object side, a spherical lens having a negative refractive power and a meniscal-shape where the concave surface faces toward the image plane, an aspheric lens having a negative refractive power and a concave surface facing toward the image plane, and a lens having a positive refractive power. By disposing farthest on the object side of the optical system, a low cost spherical lens having the largest diameter in the optical system, the manufacturing cost of the optical system can be reduced. In addition, both wide angle views and reductions in the size of the optical system can be achieved easily.

In the zoom lens according to the present invention, the negative aspheric lens included in the second lens section is disposed farthest on the image side of the second lens section, whereby various types of aberration that cannot be corrected by the first lens section can be easily corrected. In other words, prominent aberration consequent to wide angle views can be corrected well by the second lens section and a zoom lens having yet better imaging performance can be realized.

As described, the zoom lens according to the present invention enables the manufacturing cost of the optical system to be reduced by disposing a low cost spherical lens farthest on the object side and by forming lenses of small diameters (not the large diameter lens disposed farthest on the object side) to be aspheric. Furthermore, by additionally satisfying the conditional expressions above, a compact zoom lens can be realized that has excellent imaging performance and an angle of view that exceeds 100 degrees. In addition, as described, by suitably moving a lens to perform zooming, focusing, and camera-shake correction, a yet better zoom lens can be realized.

Hereinafter, embodiments of the zoom lens according to the present invention will be described in detail with reference to the accompanying drawings. Nonetheless, the invention is not limited to the following embodiments.

Figure 3:
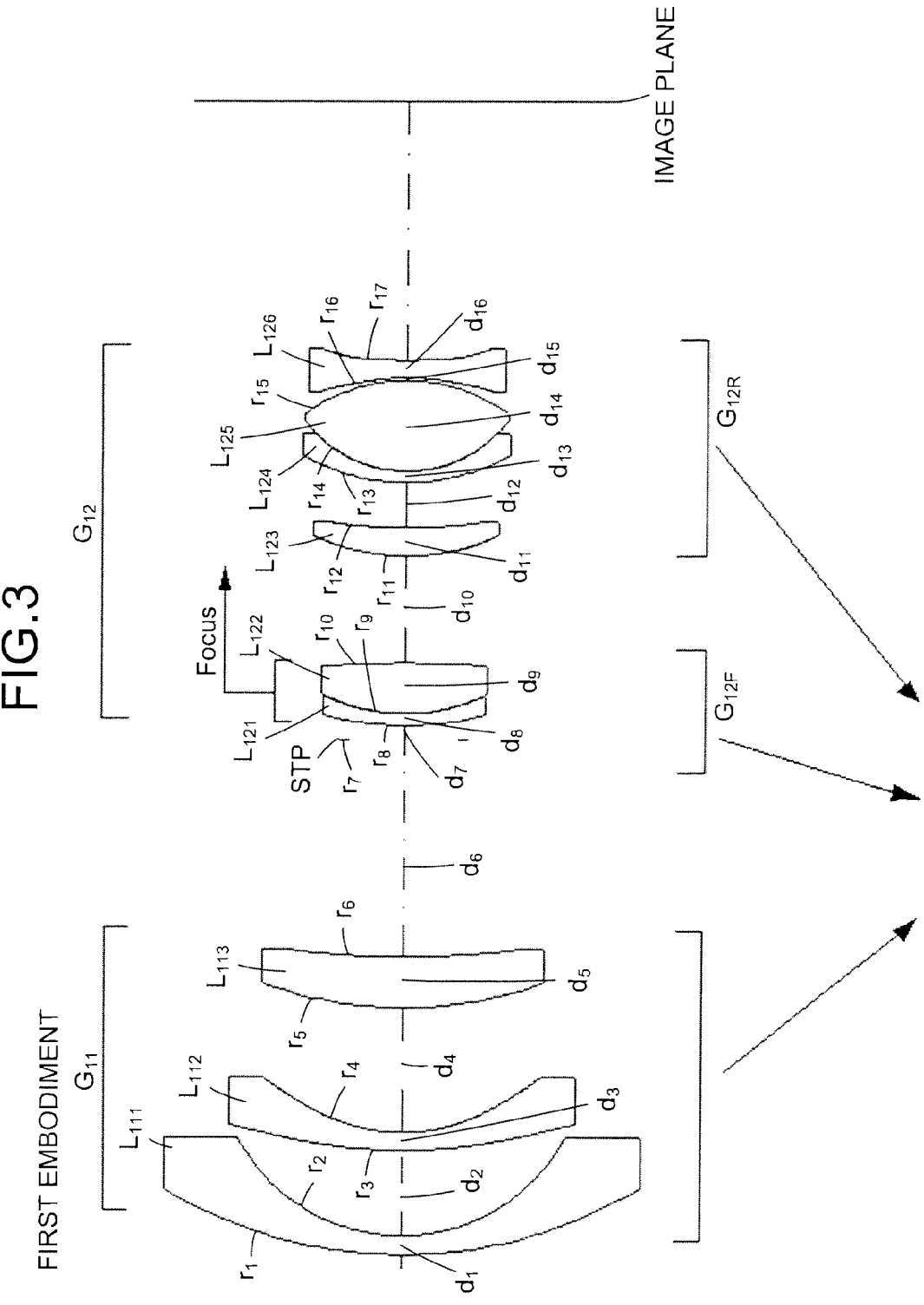
FIG. 3 is a cross sectional view (along the optical axis) of a zoom lens according to a first embodiment.

FIG. 3 is a cross sectional view (along the optical axis) of the zoom lens according to a first embodiment. The zoom lens includes sequentially from a side nearest a non-depicted object (object side), a first lens section $G_{11}$ having a negative refractive power and a second lens section $G_{12}$ having a positive refractive power.

The first lens section $G_{11}$ includes sequentially from the object side, a negative lens $L_{111}$ (first lens), a negative lens $L_{112}$ (second lens), and a positive lens $L_{113}$. The negative lens $L_{111}$ is configured by a spherical lens having a meniscal-shape where the concave surface faces toward the image plane. The negative lens $L_{112}$ is configured by an aspheric lens having a concave surface facing toward the image plane. Both surfaces of the negative lens $L_{112}$ are aspheric.

The second lens section $G_{12}$ includes sequentially from the object side, a front group $G_{12F}$ having a positive refractive power and a rear group $G_{12R}$ having a positive refractive power. The front group $G_{12F}$ includes sequentially from the object side, an aperture stop ST prescribing a given aperture, a negative lens $L_{121}$, and a positive lens $L_{122}$. The negative lens $L_{121}$ and the positive lens $L_{122}$ are cemented. The rear group $G_{12R}$ includes sequentially from the object side, a positive lens $L_{123}$, a negative lens $L_{124}$, a positive lens $L_{125}$, and a negative lens $L_{126}$ (aspheric lens). Both surfaces of the positive lens $L_{123}$ are aspheric. The negative lens $L_{124}$ and the positive lens $L_{125}$ are cemented. Both surfaces of the negative lens $L_{126}$ are aspheric.

In the zoom lens, zooming from the wide angle edge to the telephoto edge is performed by moving the first lens section $G_{11}$ along the optical axis, from the object side toward the image side, and by respectively moving the front group $G_{12F}$ and the rear group $G_{12R}$ along the optical axis, from the image side toward the object side. Focusing from infinity to the minimum object distance is performed by moving the front group $G_{12F}$ along the optical axis, from the object side toward the image side.

Here, various values related to the zoom lens according to the first embodiment are given. Focal length of zoom lens overall=10.2992(Fw: wide angle edge) to 12.5000(intermediate position) to 17.4999(telephoto edge)
F number=4.1(wide angle edge) to 4.1(intermediate position) to 4.1 (telephoto edge)
Half-angle(ω)=54.98(wide angle edge) to 49.85(intermediate position) to 38.62(telephoto edge)
Zoom ratio: 1.699

(Lens data)

$r_1 = 31.7816$
$d_1 = 1.3000$    $nd_1 = 1.77250$    $vd_1 = 49.62$
$r_2 = 12.8710$
$d_2 = 5.9116$
$r_3 = 39.9393$ (aspheric)
$d_3 = 1.2000$    $nd_2 = 1.85135$    $vd_2 = 40.10$
$r_4 = 12.1565$ (aspheric)
$d_4 = 8.5689$
$r_5 = 28.4099$
$d_5 = 3.5000$    $nd_3 = 1.84666$    $vd_3 = 23.78$
$r_6 = 66.0507$
$d_6 = D(6)$ (variable)
$r_7 = \infty$(aperture stop)
$d_7 = 1.0000$
$r_8 = 23.1071$
$d_8 = 0.8000$    $nd_4 = 1.90366$    $vd_4 = 31.31$
$r_9 = 12.4927$
$d_9 = 3.5000$    $nd_5 = 1.59551$    $vd_5 = 39.22$
$r_{10} = -80.0040$
$d_{10} = D(10)$ (variable)
$r_{11} = 15.4056$ (aspheric)
$d_{11} = 2.0000$    $nd_6 = 1.61881$    $vd_6 = 63.85$
$r_{12} = 42.9654$ (aspheric)
$d_{12} = 3.0989$
$r_{13} = 14.1040$
$d_{13} = 0.8000$    $nd_7 = 1.80610$    $vd_7 = 33.27$
$r_{14} = 8.6774$
$d_{14} = 6.3000$    $nd_8 = 1.49700$    $vd_8 = 81.61$
$r_{15} = -11.7706$
$d_{15} = 0.2000$
$r_{16} = -13.0933$ (aspheric)
$d_{16} = 1.2000$    $nd_9 = 1.85135$    $vd_9 = 40.10$
$r_{17} = 183.3464$ (aspheric)

Constants of the cone (K) and aspheric coefficients (A, B, C, D, E)
(Third plane)

$K = 0$,
$A = 4.95634 \times 10^{-5}$, $B = -7.90310 \times 10^{-7}$,
$C = 4.63906 \times 10^{-9}$, $D = -1.24036 \times 10^{-11}$,
$E = 0$
(Fourth plane)

$K = 0$,
$A = -4.13305 \times 10^{-6}$, $B = -9.52818 \times 10^{-7}$,
$C = -5.62899 \times 10^{-9}$, $D = 8.48925 \times 10^{-11}$,
$E = -4.86537 \times 10^{-13}$
(Eleventh plane)

$K = 0$,
$A = 1.28687 \times 10^{-5}$, $B = 8.97529 \times 10^{-7}$,
$C = -3.30614 \times 10^{-8}$, $D = 9.08219 \times 10^{-10}$,
$E = 0$
(Twelfth plane)

$K = 0$,
$A = 9.65316 \times 10^{-6}$, $B = 1.86173 \times 10^{-6}$,
$C = -5.11469 \times 10^{-8}$, $D = 1.35414 \times 10^{-9}$,
$E = 0$
(Sixteenth plane)

$K = 0$,
$A = 9.58940 \times 10^{-4}$, $B = -2.78957 \times 10^{-5}$,
$C = 3.88208 \times 10^{-7}$, $D = -2.26870 \times 10^{-9}$,
$E = 0$
(Seventeenth plane)

$K = 0$,
$A = 1.11782 \times 10^{-3}$, $B = -2.38818 \times 10^{-5}$,
$C = 3.36860 \times 10^{-7}$, $D = -2.11204 \times 10^{-9}$,
$E = 0$ -continued

| (Zoom data) | | | |
|---|---|---|---|
| | Wide angle edge | Intermediate position | Telephoto edge |
| D(6) | 15.0603 | 9.3234 | 2.0065 |
| D(10) | 7.4341 | 5.2857 | 3.6802 |

(Values related to conditional expression (1))
F12(focal length of negative lens $L_{112}$)=−20.943
D23(interval between image-side surface of negative lens $L_{112}$ and object-side surface of positive lens $L_{113}$)=8.569

$$F12/D23=-2.444$$

(Values related to conditional expression (2))

$$(Fw \times F12)/(D23)^2=-2.9388$$

(Values related to conditional expression (3))
φ1(maximum effective diameter of image-side surface of negative lens $L_{112}$)=19.40
Δ1(difference of perimeter edge of aspheric surface C1A and perimeter edge of paraxial spherical surface C1B (Δ1=C1A−C1B), on perimeter of area demarcated by maximum effective diameter φ of image-side surface of negative lens $L_{112}$)=−1.036

$$|100 \times \Delta 1/\phi 1|=5.338$$

(Values related to conditional expression (4))
φ2(maximum effective diameter of image-side surface of negative lens $L_{126}$)=12.00
Δ2(difference of perimeter edge of aspheric surface C2A and perimeter edge of paraxial spherical surface C2B (Δ2=C2A−C2B), on perimeter of area demarcated by maximum effective diameter φ2 of image-side surface of negative lens $L_{126}$)=0.316

$$100 \times |(\Delta 1/\phi 1)-(\Delta 2/\phi 2)|=1=7.975$$

Figure 4:
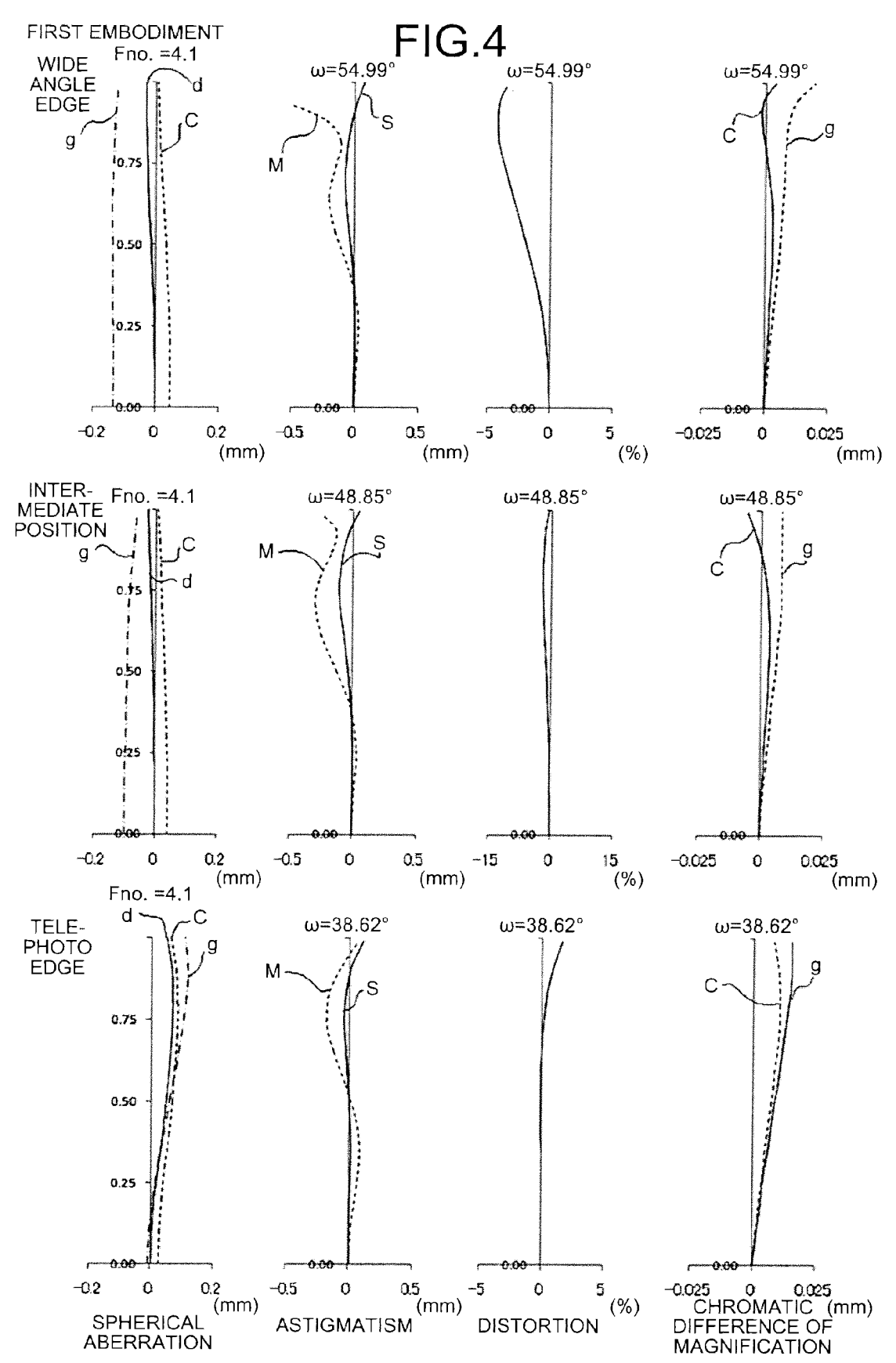

FIG. 4 is a diagram of various types of aberration occurring in the zoom lens according to the first embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.28 nm). S and M shown with respect to astigmatism, respectively indicate aberration at the sagittal image plane and at the meridonal image plane.

Figure 5:
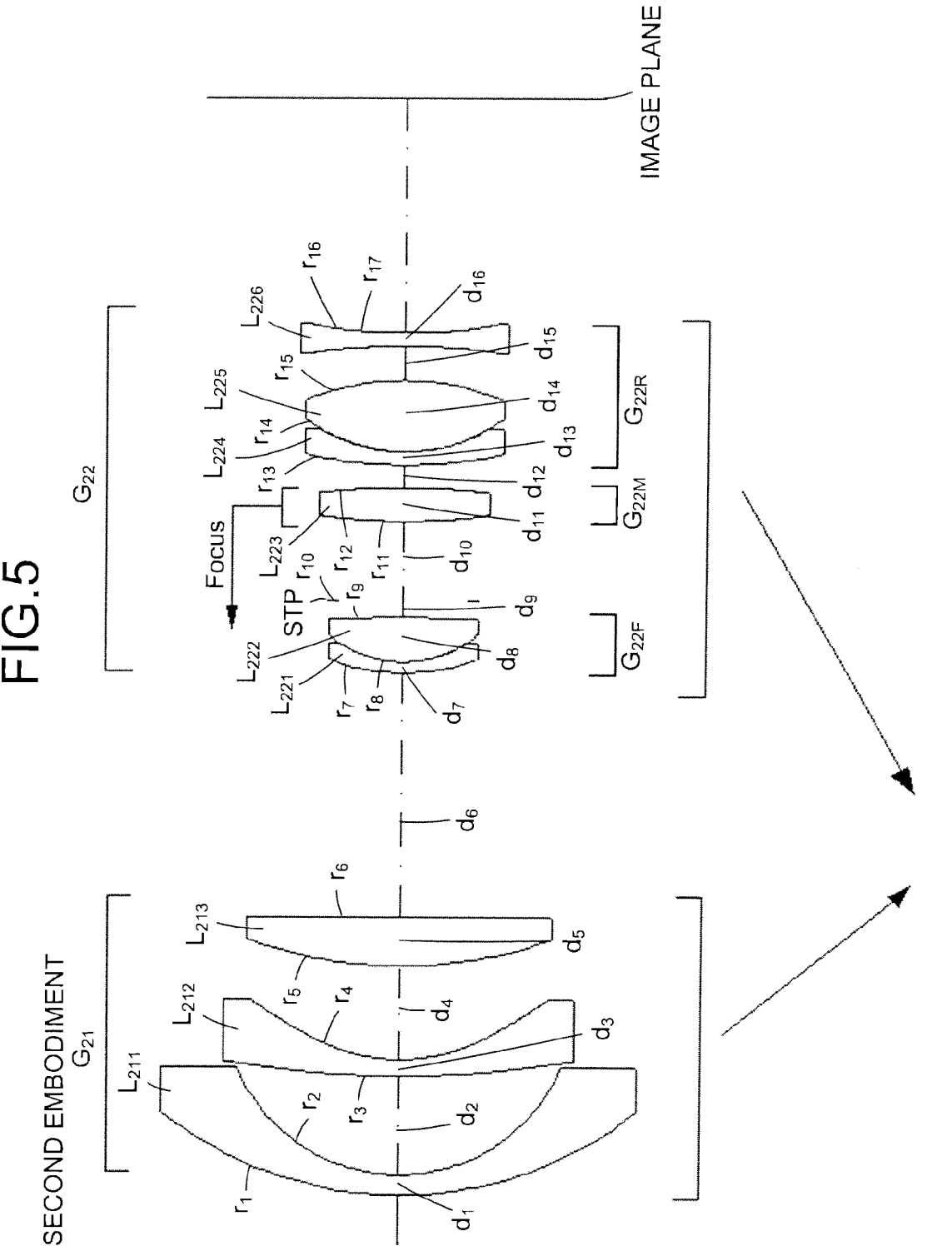
FIG. 5 is a cross sectional view (along the optical axis) of the zoom lens according to a second embodiment.

FIG. 5 is a cross sectional view (along the optical axis) of the zoom lens according to a second embodiment. The zoom lens includes sequentially from the object side, a first lens section $G_{21}$ having a negative refractive power and a second lens section $G_{22}$ having a positive refractive power.

The first lens section $G_{21}$ includes sequentially from the object side, a negative lens $L_{211}$ (first lens), a negative lens $L_{212}$ (second lens), and a positive lens $L_{213}$. The negative lens $L_{211}$ is configured by a spherical lens having a meniscal-shape where the concave surface faces toward the image plane. The negative lens $L_{212}$ is configured by an aspheric lens having a concave surface facing toward the image plane. Both surfaces of the negative lens $L_{212}$ are aspheric.

The second lens section $G_{22}$ includes sequentially from the object side, a front group $G_{22F}$ having a positive refractive power, an intermediate group $G_{22M}$ having a positive refractive power, and a rear group $G_{22R}$ having a positive refractive power. The front group $G_{22F}$ includes sequentially from the object side, a negative lens $L_{221}$, a positive lens $L_{222}$, and the aperture stop ST prescribing a given aperture. The negative lens $L_{221}$ and the positive lens $L_{222}$ are cemented. The intermediate group $G_{22M}$ is configured by a positive lens $L_{223}$. Both surfaces of the positive lens $L_{223}$ are aspheric. The rear group $G_{22R}$ includes sequentially from the object side, a negative lens $L_{224}$, a positive lens $L_{225}$, and a negative lens $L_{226}$ (aspheric lens). The negative lens $L_{224}$ and the positive lens $L_{225}$ are cemented. Both surfaces of the negative lens $L_{226}$ are aspheric.

In the zoom lens, zooming from the wide angle edge to the telephoto edge is performed by moving the first lens section $G_{21}$ along the optical axis, from the object side toward the image side, and by moving the second lens section $G_{22}$ along the optical axis, from the image side toward the object side. Focusing from infinity to the minimum object distance is performed by moving the intermediate group $G_{22M}$ along the optical axis, from the image side toward the object side.

Here, various values related to the zoom lens according to the second embodiment are given.

Focal length of zoom lens overall=10.2993(Fw: wide angle edge) to 12.4992(intermediate position) to 17.4990(telephoto edge)

F number=3.6(wide angle edge) to 3.8(intermediate position) to 4.0(telephoto edge)

Half-angle(ω)=55.02(wide angle edge) to 49.05(intermediate position) to 38.88(telephoto edge)

Zoom ratio: 1.699

| (Lens data) | | | |
|---|---|---|---|
| $r_1$ = 28.0536 | | | |
| $d_1$ = 1.5000 | | $nd_1$ = 1.83481 | $vd_1$ = 42.72 |
| $r_2$ = 13.0579 | | | |
| $d_2$ = 7.2984 | | | |
| $r_3$ = 82.6038 (aspheric) | | | |
| $d_3$ = 1.2000 | | $nd_2$ = 1.85135 | $vd_2$ = 40.10 |
| $r_4$ = 12.9284 (aspheric) | | | |
| $d_4$ = 6.8839 | | | |
| $r_5$ = 33.0842 | | | |
| $d_5$ = 3.5000 | | $nd_3$ = 1.84666 | $vd_3$ = 23.78 |
| $r_6$ = −34473.0453 | | | |
| $d_6$ = D(6) (variable) | | | |
| $r_7$ = 16.4693 | | | |
| $d_7$ = 8.0000 | | $nd_4$ = 1.90366 | $vd_4$ = 31.31 |
| $r_8$ = 8.5000 | | | |
| $d_8$ = 3.3000 | | $nd_5$ = 1.59551 | $vd_5$ = 39.22 |
| $r_9$ = −125.4304 | | | |
| $d_9$ = 1.2000 | | | |
| $r_{10}$ = ∞ (aperture stop) | | | |
| $d_{10}$ = 5.9501 | | | |
| $r_{11}$ = 41.9266 (aspheric) | | | |
| $d_{11}$ = 2.5000 | | $nd_6$ = 1.59201 | $vd_6$ = 67.02 |
| $r_{12}$ = −65.9904 (aspheric) | | | |
| $d_{12}$ = 1.7000 | | | |
| $r_{13}$ = 33.2313 | | | |
| $d_{13}$ = 1.0000 | | $nd_7$ = 1.69895 | $vd_7$ = 30.05 |
| $r_{14}$ = 11.8016 | | | |
| $d_{14}$ = 5.3000 | | $nd_8$ = 1.49700 | $vd_8$ = 81.61 |
| $r_{15}$ = −19.2021 | | | |
| $d_{15}$ = 2.5709 | | | |
| $r_{16}$ = −42.4918 (aspheric) | | | |
| $d_{16}$ = 1.0000 | | $nd_9$ = 1.85135 | $vd_9$ = 40.10 |
| $r_{17}$ = 86.8262 (aspheric) | | | |

Constants of the cone (K) and aspheric coefficients (A, B, C, D, E)
(Third plane)

K = 0,
A = 3.77248 × $10^{-5}$, B = −4.82207 × $10^{-7}$,
C = 2.52327 × $10^{-9}$, D = −5.53606 × $10^{-12}$,
E = 0

-continued (Fourth plane)

K = 0,
A = −3.19307 × 10$^{-5}$, B = −4.94567 × 10$^{-7}$,
C = −5.29875 × 10$^{-9}$, D = 6.20691 × 10$^{-11}$,
E = −2.83735 × 10$^{-13}$
(Eleventh plane)

K = 0,
A = −1.11816 × 10$^{-5}$, B = −7.65302 × 10$^{-7}$,
C = 2.32430 × 10$^{-8}$, D = 8.59980 × 10$^{-11}$,
E = 0
(Twelfth plane)

K = 0,
A = −4.64567 × 10$^{-5}$, B = −5.92188 × 10$^{-7}$,
C = 3.93860 × 10$^{-9}$, D = 3.58575 × 10$^{-10}$,
E = 0
(Sixteenth plane)

K = 0,
A = 1.89154 × 10$^{-4}$, B = −4.46191 × 10$^{-6}$,
C = 8.91938 × 10$^{-9}$, D = 2.53860 × 10$^{-10}$,
E = 0
(Seventeenth plane)

K = 0,
A = 3.16118 × 10$^{-4}$, B = −4.72371 × 10$^{-6}$,
C = 3.10546 × 10$^{-8}$, D = 1.75862 × 10$^{-11}$,
E = 0

(Zoom data)

| | Wide angle edge | Intermediate position | Telephoto edge |
|---|---|---|---|
| D(6) | 18.2967 | 11.2482 | 1.8196 |

(Values related to conditional expression (1))
F12(focal length of negative lens $L_{212}$)=−18.147
D23(interval between image-side surface of negative lens $L_{212}$ and object-side surface of positive lens $L_{213}$)=6.884

$$F12/D23 = -2.636$$

(Values related to conditional expression (2))

$$(Fw \times F12)/(D23)^2 = -3.944$$

(Values related to conditional expression (3))
φ1(maximum effective diameter of image-side surface of negative lens $L_{212}$)=21.20
Δ1(difference of perimeter edge of aspheric surface C1A and perimeter edge of paraxial spherical surface C1B (Δ1=C1A−C1B), on perimeter of area demarcated by maximum effective diameter φ of image-side surface of negative lens $L_{212}$)=−1.504

$$100 \times \Delta1/\phi1 = 7.095$$

(Values related to conditional expression (4))
φ2(maximum effective diameter of image-side surface of negative lens $L_{226}$)=13.70
Δ2(difference of perimeter edge of aspheric surface C2A and perimeter edge of paraxial spherical surface C2B (Δ2=C2A−C2B), on perimeter of area demarcated by maximum effective diameter φ2 of image-side surface of negative lens $L_{226}$)=0.306

$$100 \times |(\Delta1/\phi1) - (\Delta2/\phi2)| = 9.329$$

Figure 6:
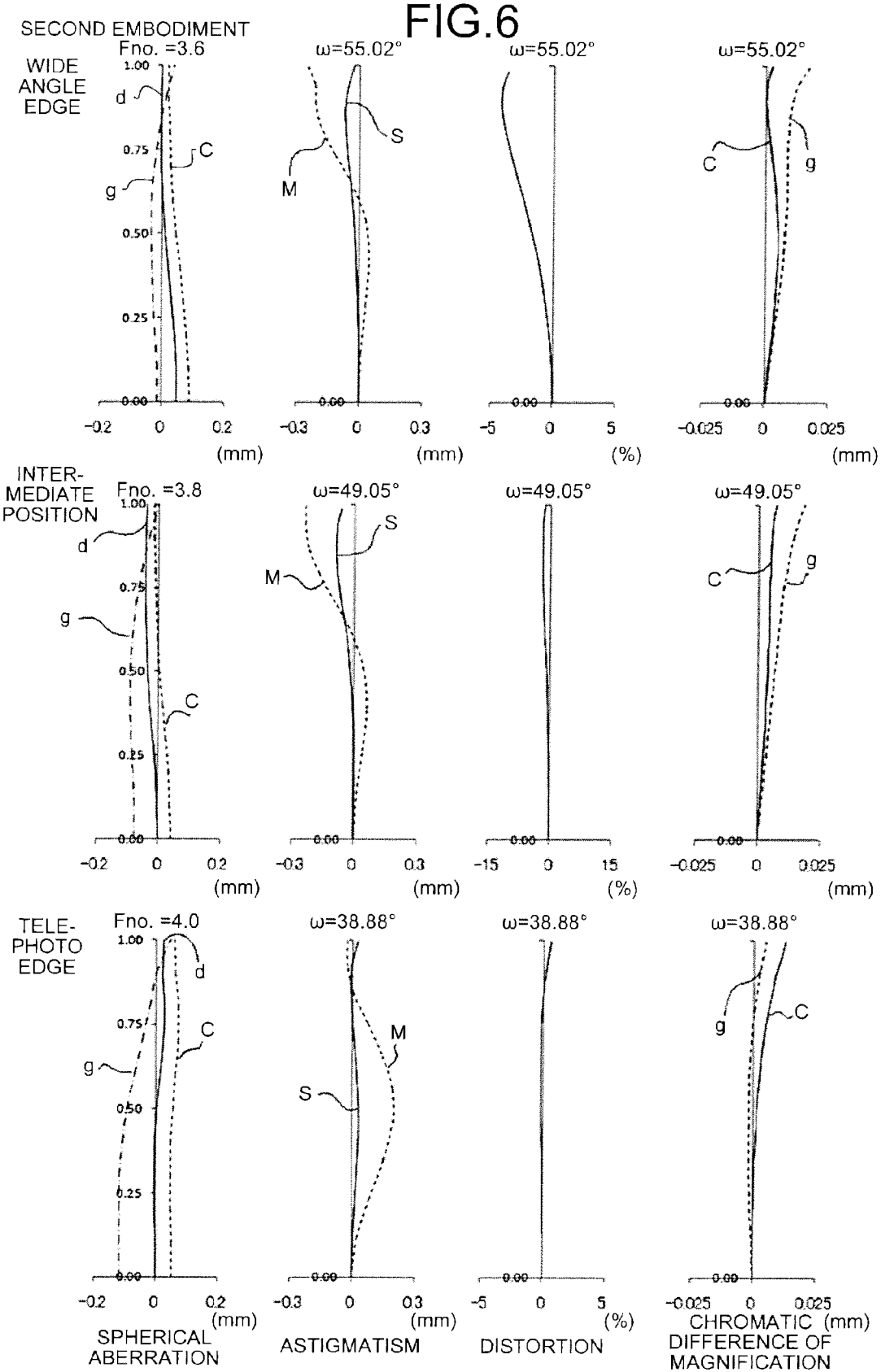
FIG. 6 is a diagram of various types of aberration occurring in the zoom lens according to the second embodiment.

FIG. 6 is a diagram of various types of aberration occurring in the zoom lens according to the second embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.28 nm). S and M shown with respect to astigmatism, respectively indicate aberration at the sagittal image plane and at the meridonal image plane.

Figure 7:
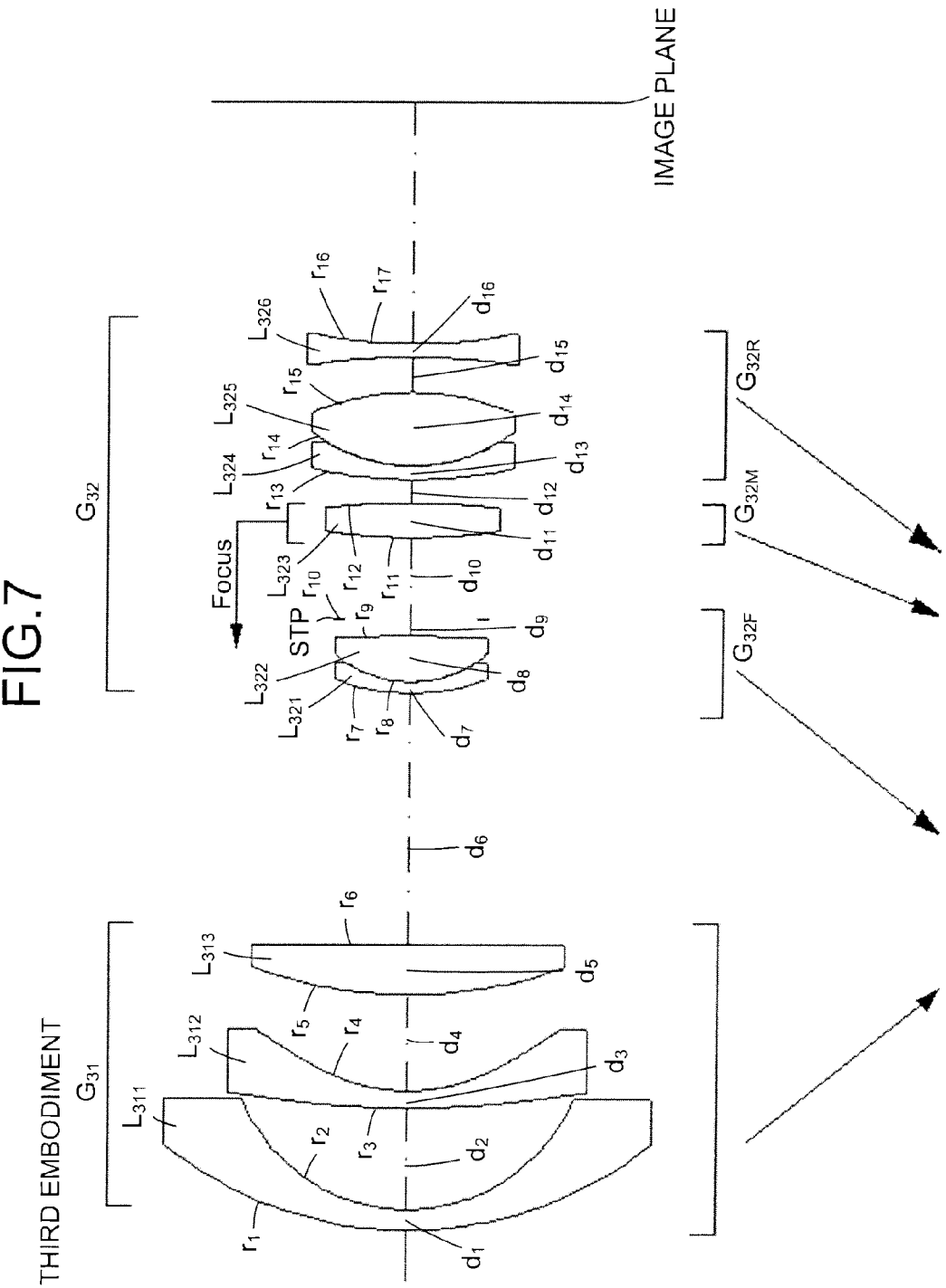
FIG. 7 is a cross sectional view (along the optical axis) of the zoom lens according to a third embodiment.

FIG. 7 is a cross sectional view (along the optical axis) of the zoom lens according to a third embodiment. The zoom lens includes sequentially from the object side, a first lens section $G_{31}$ having a negative refractive power and a second lens section $G_{32}$ having a positive refractive power.

The first lens section $G_{31}$ includes sequentially from the object side, a negative lens $L_{311}$ (first lens), a negative lens $L_{312}$ (second lens), and a positive lens $L_{313}$. The negative lens $L_{311}$ is configured by a spherical lens having a meniscal-shape where the concave surface faces toward the image plane. The negative lens $L_{312}$ is configured by an aspheric lens having a concave surface facing toward the image plane. Both surfaces of the negative lens $L_{312}$ are aspheric.

The second lens section $G_{32}$ includes sequentially from the object side, a front group $G_{32F}$ having a positive refractive power, an intermediate group $G_{32M}$ having a positive refractive power, and a rear group $G_{32R}$ having a positive refractive power. The front group $G_{32F}$ includes sequentially from the object side, a negative lens $L_{321}$, a positive lens $L_{322}$, and the aperture stop ST prescribing a given aperture. The negative lens $L_{321}$ and the positive lens $L_{322}$ are cemented. The intermediate group $G_{32M}$ is configured by a positive lens $L_{323}$. Both surfaces of the positive lens $L_{323}$ are aspheric. The rear group $G_{32R}$ includes sequentially from the object side, a negative lens $L_{324}$, a positive lens $L_{325}$, and a negative lens $L_{326}$ (aspheric lens). The negative lens $L_{324}$ and the positive lens $L_{325}$ are cemented. Both surfaces of the negative lens $L_{326}$ are aspheric.

In the zoom lens, zooming from the wide angle edge to the telephoto edge is performed by moving the first lens section $G_{31}$ along the optical axis, from the object side toward the image side, and by respectively moving the front group $G_{32F}$, the intermediate group $G_{32M}$ and the rear group $G_{32R}$, along the optical axis, from the image side toward the object side. Focusing from infinity to the minimum object distance is performed by moving the intermediate group $G_{32M}$ along the optical axis, from the image side toward the object side.

Here, various values related to the zoom lens according to the third embodiment are given. Focal length of zoom lens overall=10.3039(Fw: wide angle edge) to 12.5049(intermediate position) to 17.5071(telephoto edge)
F number=3.6(wide angle edge) to 3.8(intermediate position) to 4.0(telephoto edge)
Half-angle(ω)=54.98(wide angle edge) to 49.02(intermediate position) to 38.94(telephoto edge)
Zoom ratio: 1.699

(Lens data)

| | | | |
|---|---|---|---|
| $r_1$ = 29.1198 | | | |
| $d_1$ = 1.5000 | $nd_1$ = 1.83481 | $vd_1$ = 42.72 | |
| $r_2$ = 13.1003 | | | |
| $d_2$ = 7.2001 | | | |
| $r_3$ = 69.8822 (aspheric) | | | |
| $d_3$ = 1.2000 | $nd_2$ = 1.85135 | $vd_2$ = 40.10 | |
| $r_4$ = 12.9172 (aspheric) | | | |
| $d_4$ = 6.9761 | | | |
| $r_5$ = 32.7186 | | | |
| $d_5$ = 3.5000 | $nd_3$ = 1.84666 | $vd_3$ = 23.78 | |
| $r_6$ = 1528.6256 | | | |
| $d_6$ = D(6) (variable) | | | |
| $r_7$ = 16.1189 | | | |
| $d_7$ = 0.8000 | $nd_4$ = 1.90366 | $vd_4$ = 31.31 | |
| $r_8$ = 8.5000 | | | |
| $d_8$ = 3.2000 | $nd_5$ = 1.59551 | $vd_5$ = 39.22 | |

-continued $r_9 = -212.0872$
$d_9 = 1.2000$
$r_{10} = \infty$ (aperture stop)
$d_{10} = D(10)$ (variable)
$r_{11} = 41.7024$ (aspheric)
$d_{11} = 2.5000$      $nd_6 = 1.59201$      $vd_6 = 67.02$
$r_{12} = -78.6776$ (aspheric)
$d_{12} = D(12)$ (variable)
$r_{13} = 30.6698$
$d_{13} = 1.0000$      $nd_7 = 1.72825$      $vd_7 = 28.32$
$r_{14} = 12.3584$
$d_{14} = 4.6371$      $nd_8 = 1.49700$      $vd_8 = 81.61$
$r_{15} = -20.0455$
$d_{15} = 2.7972$
$r_{16} = -47.1564$ (aspheric)
$d_{16} = 1.0000$      $nd_9 = 1.85135$      $vd_9 = 40.10$
$r_{17} = 86.8262$ (aspheric)

Constants of the cone (K) and aspheric coefficients (A, B, C, D, E)
(Third plane)

$K = 0$,
$A = 3.91172 \times 10^{-5}$, $B = -5.15238 \times 10^{-7}$,
$C = 2.73775 \times 10^{-9}$, $D = -5.93388 \times 10^{-12}$,
$E = 0$
(Fourth plane)

$K = 0$,
$A = -3.04683 \times 10^{-5}$, $B = -5.21452 \times 10^{-7}$,
$C = -5.43653 \times 10^{-9}$, $D = 6.59653 \times 10^{-11}$,
$E = -3.00854 \times 10^{-13}$
(Eleventh plane)

$K = 0$,
$A = -7.90160 \times 10^{-6}$, $B = -8.02610 \times 10^{-7}$,
$C = 1.34383 \times 10^{-8}$, $D = 2.16272 \times 10^{-10}$,
$E = 0$
(Twelfth plane)

$K = 0$,
$A = -3.41004 \times 10^{-5}$, $B = -8.24775 \times 10^{-7}$,
$C = -7.77380 \times 10^{-10}$, $D = 4.15702 \times 10^{-10}$,
$E = 0$
(Sixteenth plane)

$K = 0$,
$A = 2.86476 \times 10^{-4}$, $B = -7.25801 \times 10^{-6}$,
$C = 4.09409 \times 10^{-8}$, $D = 1.08437 \times 10^{-10}$,
$E = 0$
(Seventeenth plane)

$K = 0$,
$A = 4.08742 \times 10^{-4}$, $B = -7.44810 \times 10^{-6}$,
$C = 5.99352 \times 10^{-8}$, $D = -8.87625 \times 10^{-11}$,
$E = 0$ (Zoom data)

|  | Wide angle edge | Intermediate position | Telephoto edge |
| --- | --- | --- | --- |
| D(6) | 18.6418 | 11.4735 | 1.8291 |
| D(10) | 5.5582 | 5.8068 | 6.1367 |
| D(12) | 2.2785 | 2.0299 | 1.7000 |

(Values related to conditional expression (1))
F12(focal length of negative lens $L_{312}$)=−18.795
D23(interval between image-side surface of negative lens $L_{312}$ and object-side surface of positive lens $L_{313}$)=6.976

$F12/D23=-2.694$ (Values related to conditional expression (2))

$(Fw \times F12)/(D23)^2=-3.980$ (Values related to conditional expression (3))
φ1(maximum effective diameter of image-side surface of negative lens $L_{312}$)=21.30
Δ1(difference of perimeter edge of aspheric surface C1A and perimeter edge of paraxial spherical surface C1B (Δ1=C1A−C1B), on perimeter of area demarcated by maximum effective diameter φ of image-side surface of negative lens $L_{312}$)=−1.548

$|100 \times \Delta1/\phi1|=7.268$ (Values related to conditional expression (4))φ2(maximum effective diameter of image-side surface of negative lens $L_{326}$)=13.70
Δ2(difference of perimeter edge of aspheric surface C2A and perimeter edge of paraxial spherical surface C2B (Δ2=C2A−C2B), on perimeter of area demarcated by maximum effective diameter φ2 of image-side surface of negative lens $L_{326}$)=0.297

$100 \times |(\Delta1/\phi1)-(\Delta2/\phi2)|=9.434$

Figure 8:
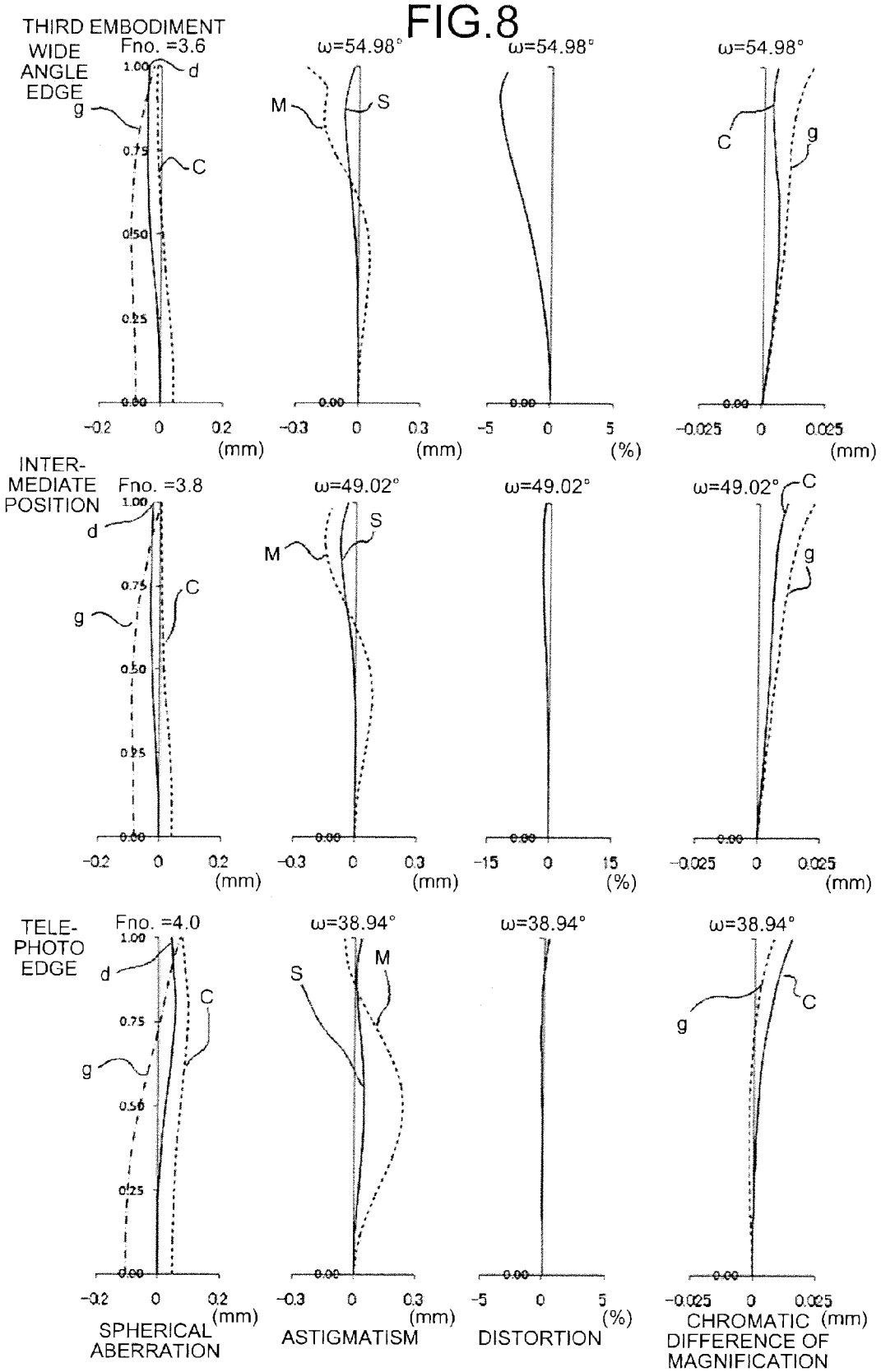
FIG. 8 is a diagram of various types of aberration occurring in the zoom lens according to the third embodiment.

FIG. 8 is a diagram of various types of aberration occurring in the zoom lens according to the third embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.28 nm). S and M shown with respect to astigmatism, respectively indicate aberration at the sagittal image plane and at the meridonal image plane.

Figure 9:
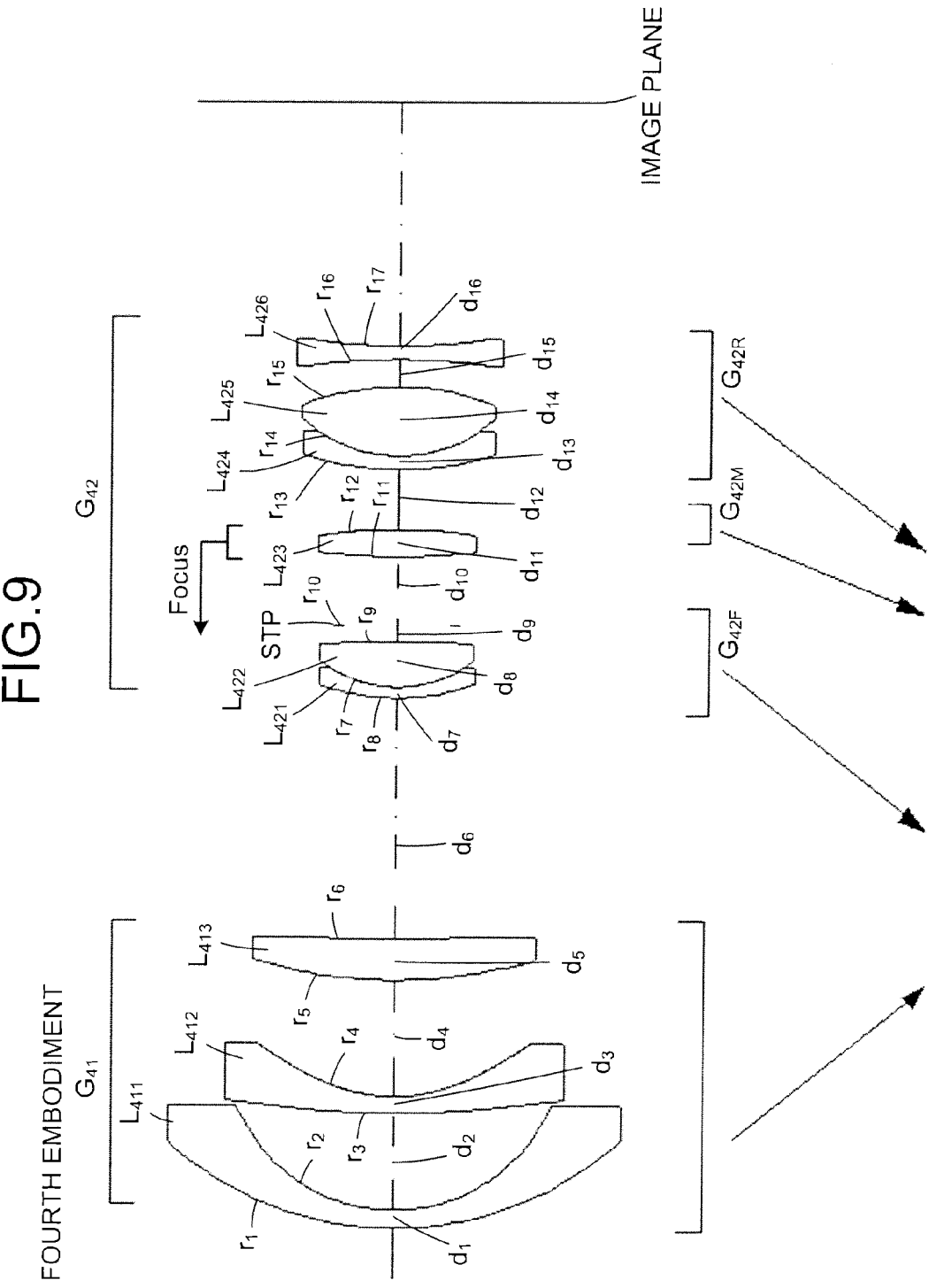
FIG. 9 is a cross sectional view (along the optical axis) of the zoom lens according to a fourth embodiment.

FIG. 9 is a cross sectional view (along the optical axis) of the zoom lens according to a fourth embodiment. The zoom lens includes sequentially from the object side, a first lens section $G_{41}$ having a negative refractive power and a second lens section $G_{42}$ having a positive refractive power.

The first lens section $G_{41}$ includes sequentially from the object side, a negative lens $L_{411}$ (first lens), a negative lens $L_{412}$ (second lens), and a positive lens $L_{413}$. The negative lens $L_{411}$ is configured by a spherical lens having a meniscal-shape where the concave surface faces toward the image plane. The negative lens $L_{412}$ is configured by an aspheric lens having a concave surface facing toward the image plane. Both surfaces of the negative lens $L_{412}$ are aspheric.

The second lens section $G_{42}$ includes sequentially from the object side, a front group $G_{42F}$ having a positive refractive power, an intermediate group $G_{42M}$ having a positive refractive power, and a rear group $G_{42R}$ having a negative refractive power. The front group $G_{42F}$ includes sequentially from the object side, a negative lens $L_{421}$, a positive lens $L_{422}$, and the aperture stop ST prescribing a given aperture. The negative lens $L_{421}$ and the positive lens $L_{422}$ are cemented. The intermediate group $G_{42M}$ is configured by a positive lens $L_{423}$. Both surfaces of the positive lens $L_{423}$ are aspheric. The rear group $G_{42R}$ includes sequentially from the object side, a negative lens $L_{424}$, a positive lens $L_{425}$, and a negative lens $L_{426}$ (aspheric lens). The negative lens $L_{424}$ and the positive lens $L_{425}$ are cemented. Both surfaces of the negative lens $L_{426}$ are aspheric.

In the zoom lens, zooming from the wide angle edge to the telephoto edge is performed by moving the first lens section $G_{41}$ along the optical axis, from the object side toward the image side, and by respectively moving the front group $G_{42F}$, the intermediate group $G_{42M}$ and the rear group $G_{42R}$ along the optical axis, from the image side toward the object side. Focusing from infinity to the minimum object distance is performed by moving the intermediate group $G_{42M}$ along the optical axis, from the image side toward the object side.

Here, various values related to the zoom lens according to the fourth embodiment are given.

Focal length of zoom lens overall=10.30(Fw: wide angle edge) to 12.50(intermediate position) to 17.50(telephoto edge)

F number=4.10(wide angle edge) to 4.10(intermediate position) to 4.10(telephoto edge)

Half-angle($\omega$)=55.05(wide angle edge) to 49.06(intermediate position) to 38.97(telephoto edge)

Zoom ratio: 1.699

(Lens data)

| | | | |
|---|---|---|---|
| $r_1$ = 24.5641 | | | |
| $d_1$ = 1.3000 | $nd_1$ = 1.83481 | | $vd_1$ = 42.72 |
| $r_2$ = 12.4205 | | | |
| $d_2$ = 6.9634 | | | |
| $r_3$ = 80.9157 (aspheric) | | | |
| $d_3$ = 1.2000 | $nd_2$ = 1.85135 | | $vd_2$ = 40.10 |
| $r_4$ = 12.3254 (aspheric) | | | |
| $d_4$ = 8.3197 | | | |
| $r_5$ = 35.9449 | | | |
| $d_5$ = 3.0000 | $nd_3$ = 1.84666 | | $vd_3$ = 23.78 |
| $r_6$ = 1537.5016 | | | |
| $d_6$ = D(6) (variable) | | | |
| $r_7$ = 16.1541 | | | |
| $d_7$ = 0.8000 | $nd_4$ = 1.90366 | | $vd_4$ = 31.31 |
| $r_8$ = 8.5000 | | | |
| $d_8$ = 3.3000 | $nd_5$ = 1.59551 | | $vd_5$ = 39.22 |
| $r_9$ = −521.4563 | | | |
| $d_9$ = 1.2000 | | | |
| $r_{10}$ = ∞ (aperture stop) | | | |
| $d_{10}$ = D(10) (variable) | | | |
| $r_{11}$ = 39.7672 (aspheric) | | | |
| $d_{11}$ = 2.0000 | $nd_6$ = 1.59201 | | $vd_6$ = 67.02 |
| $r_{12}$ = −45.3773 (aspheric) | | | |
| $d_{12}$ = D(12) (variable) | | | |
| $r_{13}$ = 22.5000 | | | |
| $d_{13}$ = 1.0000 | $nd_7$ = 1.90366 | | $vd_7$ = 31.31 |
| $r_{14}$ = 10.1715 | | | |
| $d_{14}$ = 5.0000 | $nd_8$ = 1.49700 | | $vd_8$ = 81.61 |
| $r_{15}$ = −19.3392 | | | |
| $d_{15}$ = 1.9857 | | | |
| $r_{16}$ = −45.3966 (aspheric) | | | |
| $d_{16}$ = 1.0000 | $nd_9$ = 1.85135 | | $vd_9$ = 40.10 |
| $r_{17}$ = 69.5133 (aspheric) | | | |

Constants of the cone (K) and aspheric coefficients (A, B, C, D, E)
(Third plane)

K = 0,
A = 3.28812 × 10$^{-5}$, B = −4.35799 × 10$^{-7}$,
C = 2.22432 × 10$^{-9}$, D = −5.14760 × 10$^{-12}$,
E = 0
(Fourth plane)

K = 0,
A = −4.86859 × 10$^{-5}$, B = −4.29034 × 10$^{-7}$,
C = −7.97657 × 10$^{-9}$, D = 8.39364 × 10$^{-11}$,
E = −4.07696 × 10$^{-13}$
(Eleventh plane)

K = 0,
A = −5.92137 × 10$^{-5}$, B = −1.33847 × 10$^{-6}$,
C = 1.67253 × 10$^{-8}$, D = 3.49851 × 10$^{-12}$,
E = 0
(Twelfth plane)

K = 0,
A = −8.86050 × 10$^{-5}$, B = −1.21824 × 10$^{-6}$,
C = 6.52842 × 10$^{-9}$, D = 9.67347 × 10$^{-11}$,
E = 0
(Sixteenth plane)

K = 0,
A = 7.35180 × 10$^{-5}$, B = −8.13193 × 10$^{-7}$,
C = −3.62480 × 10$^{-8}$, D = 5.12502 × 10$^{-10}$,
E = 0

-continued (Seventeenth plane)

K = 0,
A = 1.80453 × 10$^{-4}$, B = −1.69902 × 10$^{-6}$,
C = −6.00872 × 10$^{-9}$, D = 1.79871 × 10$^{-10}$,
E = 0

(Zoom data)

| | Wide angle edge | Intermediate position | Telephoto edge |
|---|---|---|---|
| D(6) | 17.4071 | 10.7566 | 1.8290 |
| D(10) | 5.0135 | 5.1135 | 5.2135 |
| D(12) | 4.3324 | 4.2324 | 4.1324 |

(Values related to conditional expression (1))

F12(focal length of negative lens $L_{412}$)=−17.218
D23(interval between image-side surface of negative lens $L_{412}$ and object-side surface of positive lens $L_{413}$)=8.320

$$F12/D23=-2.070$$

(Values related to conditional expression (2))

$$(Fw \times F12)/(D23)^2=-2.562$$

(Values related to conditional expression (3))

$\phi$1(maximum effective diameter of image-side surface of negative lens $L_{412}$)=19.80
Δ1(difference of perimeter edge of aspheric surface C1A and perimeter edge of paraxial spherical surface C1B (Δ1=C1A−C1B), on perimeter of area demarcated by maximum effective diameter $\phi$ of image-side surface of negative lens $L_{412}$)=−1.274

$$|100 \times \Delta 1/\phi 1|=6.435$$

(Values related to conditional expression (4))

$\phi$2(maximum effective diameter of image-side surface of negative lens $L_{426}$)=13.40
Δ2(difference of perimeter edge of aspheric surface C2A and perimeter edge of paraxial spherical surface C2B (Δ2=C2A−C2B), on perimeter of area demarcated by maximum effective diameter $\phi$2 of image-side surface of negative lens $L_{426}$)=0.198

$$100 \times |(\Delta 1/\phi 1)-(\Delta 2/\phi 2)|=7.909$$

Figure 10:
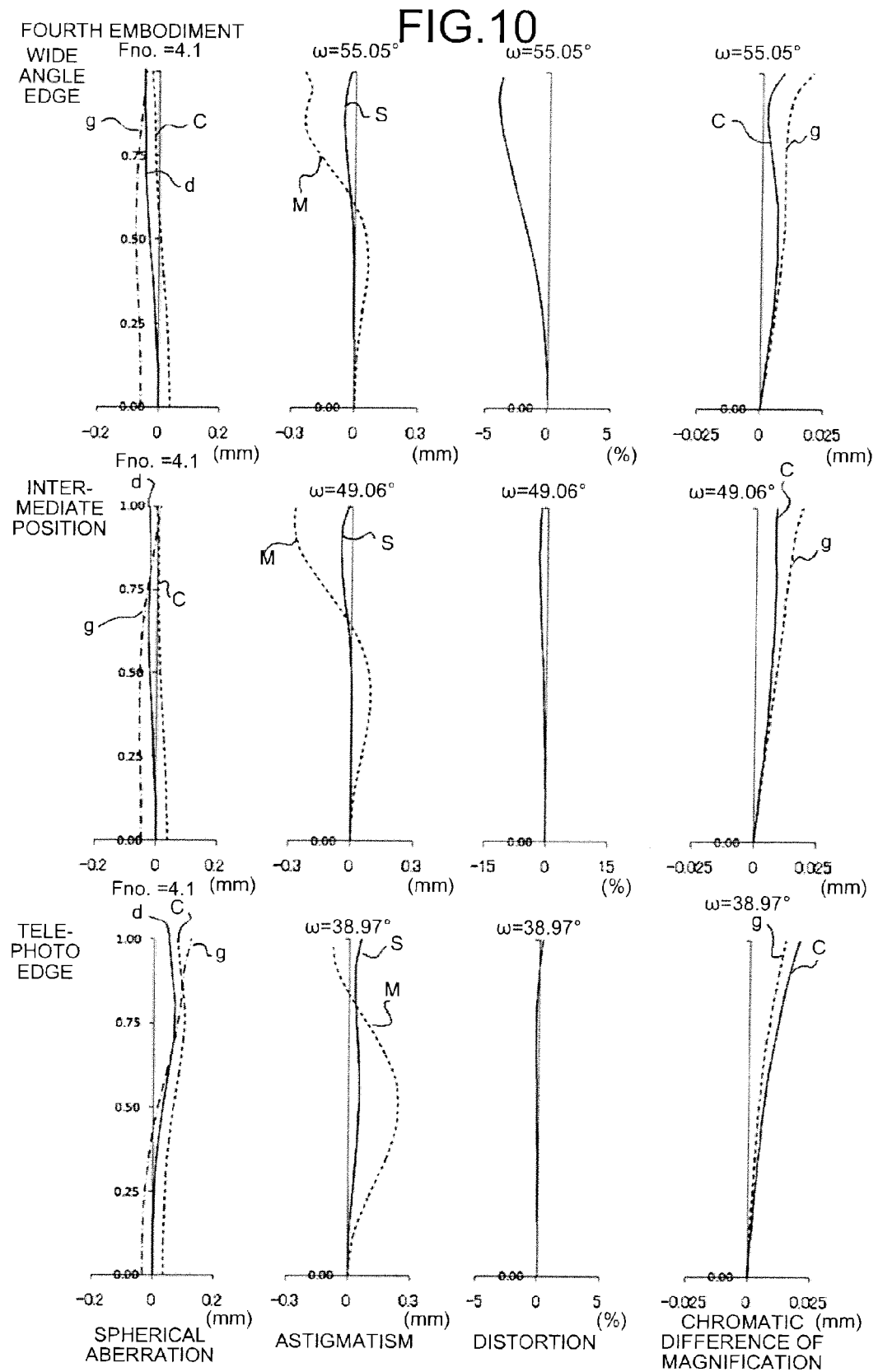
FIG. 10 is a diagram of various types of aberration occurring in the zoom lens according to the fourth embodiment

FIG. 10 is a diagram of various types of aberration occurring in the zoom lens according to the fourth embodiment. In the diagram, g indicates the wavelength aberration corresponding to g-line ($\lambda$=435.83 nm), d indicates the wavelength aberration corresponding to d-line ($\lambda$=587.56 nm), and C indicates the wavelength aberration corresponding to C-line ($\lambda$=656.28 nm). S and M shown with respect to astigmatism, respectively indicate aberration at the sagittal image plane and at the meridonal image plane.

FIG. 11 is a cross sectional view (along the optical axis) of the zoom lens according to a fifth embodiment. The zoom lens includes sequentially from the object side, a first lens section $G_{51}$ having a negative refractive power and a second lens section $G_{52}$ having a positive refractive power.

The first lens section $G_{51}$ includes sequentially from the object side, a negative lens $L_{511}$ (first lens), a negative lens $L_{512}$ (second lens), and a positive lens $L_{513}$. The negative lens $L_{511}$ is configured by a spherical lens having a meniscal-shape where the concave surface faces toward the image plane. The negative lens $L_{512}$ is configured by an aspheric lens having a concave surface facing toward the image plane. Both surfaces of the negative lens $L_{512}$ are aspheric.

The second lens section $G_{52}$ includes sequentially from the object side, a front group $G_{52F}$ having a positive refractive power, an intermediate group $G_{52M}$ having a positive refractive power, and a rear group $G_{52R}$ having a negative refractive power. The front group $G_{52F}$ includes sequentially from the object side, a positive lens $L_{521}$, the aperture stop ST prescribing a given aperture, a negative lens $L_{522}$, and a positive lens $L_{523}$. The negative lens $L_{522}$ and the positive lens $L_{523}$ are cemented. The intermediate group $G_{52M}$ is configured by a positive lens $L_{524}$. Both surfaces of the positive lens $L_{524}$ as aspheric. The rear group $G_{52R}$ includes sequentially from the object side, a negative lens $L_{525}$, a positive lens $L_{526}$, and a negative lens $L_{527}$ (aspheric lens). The negative lens $L_{525}$ and the positive lens $L_{526}$ are cemented. Both surfaces of the negative lens $L_{527}$ are aspheric.

In the zoom lens, zooming from the wide angle edge to the telephoto edge is performed by moving the first lens section $G_{51}$ along the optical axis, from the object side toward the image side, and by respectively moving the front group $G_{52F}$, the intermediate group $G_{52M}$ and the rear group $G_{52R}$ along the optical axis, from the image side toward the object side. Focusing from infinity to the minimum object distance is performed by moving the intermediate group $G_{52M}$ along the optical axis, from the image side toward the object side. Camera-shake correction is performed by moving the negative lens $L_{521}$ included in the front group $G_{52F}$, in a direction substantially orthogonal to the optical axis.

Here, various values related to the zoom lens according to the fifth embodiment are given.

Focal length of zoom lens overall=10.30(Fw: wide angle edge) to 12.50(intermediate position) to 17.50(telephoto edge)

F number=3.6(wide angle edge) to 3.8(intermediate position) to 4.0(telephoto edge)

Half-angle($\omega$)=54.98(wide angle edge) to 49.02(intermediate position) to 38.82(telephoto edge)

Zoom ratio: 1.699

(Lens data)

| | | | |
|---|---|---|---|
| $r_1$ = 27.3115 | | | |
| $d_1$ = 1.5000 | $nd_1$ = 1.83481 | | $vd_1$ = 42.72 |
| $r_2$ = 12.9354 | | | |
| $d_2$ = 7.3177 | | | |
| $r_3$ = 143.7387 (aspheric) | | | |
| $d_3$ = 1.2000 | $nd_2$ = 1.85135 | | $vd_2$ = 40.10 |
| $r_4$ = 12.2925 (aspheric) | | | |
| $d_4$ = 4.9164 | | | |
| $r_5$ = 26.5844 | | | |
| $d_5$ = 3.5000 | $nd_3$ = 1.84666 | | $vd_3$ = 23.78 |
| $r_6$ = −871.0441 | | | |
| $d_6$ = D(6) (variable) | | | |
| $r_7$ = −18.2092 | | | |
| $d_7$ = 0.8000 | $nd_4$ = 1.84666 | | $vd_4$ = 23.78 |
| $r_8$ = −26.1747 | | | |
| $d_8$ = 1.5000 | | | |
| $r_9$ = ∞ (aperture stop) | | | |
| $d_9$ = 1.0000 | | | |
| $r_{10}$ = 20.6662 | | | |
| $d_{10}$ = 0.8000 | $nd_5$ = 1.90366 | | $vd_5$ = 31.31 |
| $r_{11}$ = 10.1275 | | | |
| $d_{11}$ = 3.4000 | $nd_6$ = 1.58144 | | $vd_6$ = 40.89 |
| $r_{12}$ = −29.0999 | | | |
| $d_{12}$ = D(12) (variable) | | | |
| $r_{13}$ = 30.7643 (aspheric) | | | |
| $d_{13}$ = 2.4000 | $nd_7$ = 1.58313 | | $vd_7$ = 59.46 |
| $r_{14}$ = −79.7492 (aspheric) | | | |
| $d_{14}$ = D(14) (variable) | | | |
| $r_{15}$ = 18.9650 | | | |
| $d_{15}$ = 1.0000 | $nd_8$ = 1.91082 | | $vd_8$ = 35.25 |
| $r_{16}$ = 9.6254 | | | |
| $d_{16}$ = 6.5000 | $nd_9$ = 1.49700 | | $vd_9$ = 81.61 |
| $r_{17}$ = −18.2359 | | | |
| $d_{17}$ = 0.7205 | | | |
| $r_{18}$ = −43.0714 (aspheric) | | | |
| $d_{18}$ = 1.0000 | $nd_{10}$ = 1.85135 | | $vd_{10}$ = 40.10 |
| $r_{19}$ = 45.0000 (aspheric) | | | |

Constants of the cone (K) and aspheric coefficients (A, B, C, D, E)
(Third plane)

K = 0,
A = 7.96481 × 10$^{-5}$, B = −9.84278 × 10$^{-7}$,
C = 5.69053 × 10$^{-9}$, D = −1.36247 × 10$^{-11}$,
E = 0
(Fourth plane)

K = 0,
A = 4.87539 × 10$^{-6}$, B = −8.75480 × 10$^{-7}$,
C = −9.15535 × 10$^{-9}$, D = 1.33681 × 10$^{-10}$,
E = −6.46855 × 10$^{-13}$
(Thirteenth plane)

K = 0,
A = −2.74416 × 10$^{-5}$, B = −2.98083 × 10$^{-7}$,
C = 2.49494 × 10$^{-8}$, D = −6.63205 × 10$^{-11}$,
E = 0
(Fourteenth plane)

K = 0,
A = −4.48753 × 10$^{-5}$, B = −3.02221 × 10$^{-7}$,
C = 1.76339 × 10$^{-8}$, D = 2.79950 × 10$^{-11}$,
E = 0
(Eighteenth plane)

K = 0,
A = 2.24011 × 10$^{-4}$, B = −5.27123 × 10$^{-6}$,
C = 6.49618 × 10$^{-8}$, D = −3.99383 × 10$^{-10}$,
E = 0
(Nineteenth plane)

K = 0,
A = 3.22992 × 10$^{-4}$, B = −5.30917 × 10$^{-6}$,
C = 6.69786 × 10$^{-8}$, D = −4.62773 × 10$^{-10}$,
E = 0

(Zoom data)

| | Wide angle edge | Intermediate position | Telephoto edge |
|---|---|---|---|
| D(6) | 18.4950 | 11.5917 | 2.3290 |
| D(12) | 4.8027 | 4.8502 | 4.6046 |
| D(14) | 6.1478 | 6.1003 | 6.3459 |

(Values related to conditional expression (1))
F12(focal length of negative lens $L_{512}$)=−15.856
D23(interval between image-side surface of negative lens $L_{512}$ and object-side surface of positive lens $L_{513}$)=4.916

$$F12/D23=-3.225$$

(Values related to conditional expression (2))

$$(Fw \times F12)/(D23)^2=-6.757$$

(Values related to conditional expression (3))
φ1(maximum effective diameter of image-side surface of negative lens $L_{512}$)=20.65
Δ1(difference of perimeter edge of aspheric surface C1A and perimeter edge of paraxial spherical surface C1B (Δ1=C1A−C1B), on perimeter of area demarcated by maximum effective diameter φ of image-side surface of negative lens $L_{512}$)=−1.557

$$|100 \times \Delta1/\phi1|=7.538$$

(Values related to conditional expression (4))
φ2(maximum effective diameter of image-side surface of negative lens $L_{527}$)=14.20
Δ2(difference of perimeter edge of aspheric surface C2A and perimeter edge of paraxial spherical surface C2B (Δ2=C2A−C2B), on perimeter of area demarcated by maximum effective diameter φ2 of image-side surface of negative lens $L_{527}$)=0.239

$$|100\times|(\Delta1/\phi1)-(\Delta2/\phi2)||=9.222$$

FIG. 12 is a diagram of various types of aberration occurring in the zoom lens according to the fifth embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.28 nm). S and M shown with respect to astigmatism, respectively indicate aberration at the sagittal image plane and at the meridonal image plane.

FIG. 13 is a cross sectional view (along the optical axis) of the zoom lens according to a sixth embodiment. The zoom lens includes sequentially from the object side, a first lens section $G_{61}$ having a negative refractive power and a second lens section $G_{62}$ having a positive refractive power.

The first lens section $G_{61}$ includes sequentially from the object side, a negative lens $L_{611}$ (first lens), a negative lens $L_{612}$ (second lens), and a positive lens $L_{613}$. The negative lens $L_{611}$ is configured by a spherical lens having a meniscal-shape where the concave surface faces toward the image plane. The negative lens $L_{612}$ is configured by an aspheric lens having a concave surface facing toward the image plane. Both surfaces of the negative lens $L_{612}$ are aspheric.

The second lens section $G_{62}$ includes sequentially from the object side, a front group $G_{62F}$ having a positive refractive power, an intermediate group $G_{62M}$ having a positive refractive power, and a rear group $G_{62R}$ having a negative refractive power. The front group $G_{62F}$ includes sequentially from the object side, a positive lens $L_{621}$, the aperture stop ST prescribing a given aperture, a negative lens $L_{622}$, and a positive lens $L_{623}$. The negative lens $L_{622}$ and the positive lens $L_{623}$ are cemented. The intermediate group $G_{62M}$ is configured by a positive lens $L_{624}$. Both surfaces of the positive lens $L_{624}$ are aspheric. The rear group $G_{62R}$ includes sequentially from the object side, a negative lens $L_{625}$, a positive lens $L_{626}$, and a negative lens $L_{627}$ (aspheric lens). The negative lens $L_{625}$ and the positive lens $L_{626}$ are cemented. The surface of the negative lens $L_{627}$, facing toward the image plane is aspheric.

In the zoom lens, zooming from the wide angle edge to the telephoto edge is performed by moving the first lens section $G_{61}$ along the optical axis, from the object side toward the image side, and by respectively moving the front group $G_{62F}$, the intermediate group $G_{62M}$ and the rear group $G_{62R}$ along the optical axis, from the image side toward the object side. Focusing from infinity to the minimum object distance is performed by moving the intermediate group $G_{62M}$ along the optical axis, from the image side toward the object side.

Here, various values related to the zoom lens according to the sixth embodiment are given.

Focal length of zoom lens overall=11.30(Fw: wide angle edge) to 12.50(intermediate position) to 17.50(telephoto edge)

F number-4.1(wide angle edge) to 4.1(intermediate position) to 4.1(telephoto edge)

Half-angle(ω)=52.42(wide angle edge) to 49.17(intermediate position) to 38.65(telephoto edge)

Zoom ratio: 1.549

(Lens data)

| | | |
|---|---|---|
| $r_1 = 20.4987$ | | |
| $d_1 = 1.3000$ | $nd_1 = 1.83481$ | $vd_1 = 42.72$ |
| $r_2 = 9.4632$ | | |
| $d_2 = 5.4014$ | | |
| $r_3 = 78.1683$ (aspheric) | | |
| $d_3 = 1.2000$ | $nd_2 = 1.85135$ | $vd_2 = 40.10$ |
| $r_4 = 11.5955$ (aspheric) | | |
| $d_4 = 3.7376$ | | |
| $r_5 = 23.4921$ | | |
| $d_6 = 3.0000$ | $nd_3 = 1.84666$ | $vd_3 = 23.78$ |
| $r_6 = -6053.3755$ | | |
| $d_6 = D(6)$ (variable) | | |
| $r_7 = -24.2364$ | | |
| $d_7 = 0.8000$ | $nd_4 = 1.84666$ | $vd_4 = 23.78$ |
| $r_8 = -40.8523$ | | |
| $d_8 = 1.5000$ | | |
| $r_9 = \infty$ (aperture stop) | | |
| $d_9 = 1.0000$ | | |
| $r_{10} = 17.4651$ | | |
| $d_{10} = 0.8000$ | $nd_5 = 1.90366$ | $vd_5 = 31.31$ |
| $r_{11} = 8.8500$ | | |
| $d_{11} = 3.4000$ | $nd_6 = 1.58144$ | $vd_6 = 40.89$ |
| $r_{12} = -26.9518$ | | |
| $d_{12} = D(12)$ (variable) | | |
| $r_{13} = 26.6015$ (aspheric) | | |
| $d_{11} = 2.4000$ | $nd_7 = 1.58313$ | $vd_7 = 59.46$ |
| $r_{14} = -59.6858$ (aspheric) | | |
| $d_{14} = D(14)$ (variable) | | |
| $r_{15} = 25.9484$ | | |
| $d_{15} = 1.0000$ | $nd_8 = 1.91082$ | $vd_8 = 35.25$ |
| $r_{16} = 10.1953$ | | |
| $d_{16} = 6.5000$ | $nd_9 = 1.49700$ | $vd_9 = 81.61$ |
| $r_{17} = -17.9337$ | | |
| $d_{17} = 1.3655$ | | |
| $r_{18} = -52.7390$ | | |
| $d_{18} = 1.0000$ | $nd_{10} = 1.85135$ | $vd_{10} = 40.10$ |
| $r_{19} = 47.3932$ (aspheric) | | |

Constants of the cone (K) and aspheric coefficients (A, B, C, D, E)

(Third plane)

K = 0,
A = −1.11149 × 10$^{-5}$, B = 2.59248 × 10$^{-7}$,
C = −1.44219 × 10$^{-9}$, D = −1.48549 × 10$^{-11}$,
E = 0

(Fourth plane)

K = 0,
A = −1.21186 × 10$^{-4}$, B = −2.83516 × 10$^{-7}$,
C = 3.15813 × 10$^{-9}$, D = −2.13216 × 10$^{-10}$,
E = 8.18843 × 10$^{-13}$ (Thirteenth plane)

K = 0,
A = −6.64662 × 10$^{-5}$, B = −1.18357 × 10$^{-6}$,
C = 3.81781 × 10$^{-8}$, D = 1.73852 × 10$^{-10}$,
E = 0

(Fourteenth plane)

K = 0,
A = −9.95515 × 10$^{-5}$, B = −7.43846 × 10$^{-7}$,
C = 1.21368 × 10$^{-8}$, D = 4.63810 × 10$^{-10}$,
E = 0

(Nineteenth plane)

K = 0,
A = 1.15065 × 10$^{-4}$, B = −2.14857 × 10$^{-7}$,
C = 1.10024 × 10$^{-8}$, D = −1.21146 × 10$^{-10}$,
E = 0

-continued (Zoom data)

| | Wide angle edge | Intermediate position | Telephoto edge |
|---|---|---|---|
| D(6) | 11.8911 | 9.2879 | 2.1599 |
| D(12) | 4.2004 | 4.2579 | 3.9230 |
| D(14) | 4.5762 | 4.5187 | 4.8536 |

(Values related to conditional expression (1))
F12(focal length of negative lens $L_{612}$)=−16.126
D23(interval between image-side surface of negative lens $L_{612}$ and object-side surface of positive lens $L_{613}$)=3.738

$$F12/D23=-4.315$$

(Values related to conditional expression (2))

$$(Fw \times F12)/(D23)^2=-13.044$$

(Values related to conditional expression (3))
φ1(maximum effective diameter of image-side surface of negative lens $L_{612}$)=15.40
Δ1(difference of perimeter edge of aspheric surface C1A and perimeter edge of paraxial spherical surface C1B (Δ1=C1A−C1B), on perimeter of area demarcated by maximum effective diameter φ of image-side surface of negative lens $L_{612}$)=−0.553

$$|100 \times \Delta1/\phi1|=3.591$$

(Values related to conditional expression (4))
φ2(maximum effective diameter of image-side surface of negative lens $L_{627}$)=13.90
Δ2(difference of perimeter edge of aspheric surface C2A and perimeter edge of paraxial spherical surface C2B (Δ2=C2A−C2B), on perimeter of area demarcated by maximum effective diameter φ2 of image-side surface of negative lens $L_{627}$)=0.272

$$|100 \times |(\Delta1/\phi1)-(\Delta2/\phi2)||=5.550$$

FIG. 14 is a diagram of various types of aberration occurring in the zoom lens according to the sixth embodiment. In the diagram, g indicates the wavelength aberration corresponding to g-line (λ=435.83 nm), d indicates the wavelength aberration corresponding to the d-line (λ=587.56 nm), and C indicates the wavelength aberration corresponding to C-line (λ=656.28 nm). S and M shown with respect to astigmatism, respectively indicate aberration at the sagittal image plane and at the meridonal image plane.

Among the values for each of the embodiments, $r_1, r_2, \ldots$ indicate radii of curvature for each lens, diaphragm surface, etc.; $d_1, d_2, \ldots$ indicate the thickness of the lenses, diaphragm, etc. or the distance between surfaces thereof; $nd_1, nd_2, \ldots$ indicate the refraction index of each lens with respect to the d-line (λ=587.56 nm); and $vd_1, vd_2, \ldots$ indicate the Abbe number with respect to the d-line (λ=587.56 nm) of each lens. Lengths are indicated in units of [mm] and angles are indicated in [degrees].

Each aspheric surface shape above is expressed by equation [1], where z is the depth of the aspheric surface; y is a height in a direction orthogonal to the optical axis; and the travel direction of light is positive.

$$z = \frac{y^2}{R(1+\sqrt{1-(1+K)y/R^2})^2} + Ay^4 + By^6 + Cy^8 + Dy^{10} + Ey^{12} \quad [1]$$

Where, R is paraxial radius of curvature; K is the constant of the cone; A, B, C, D, and E are the fourth, sixth, eighth, tenth, and twelfth order aspheric coefficients, respectively.

As described, the zoom lens according to each of the embodiments above enables the manufacturing cost of the optical system to be reduced by disposing a low cost spherical lens farthest on the object side and by forming lenses of small diameters (not the large diameter lens disposed farthest on the object side) to be aspheric. Furthermore, by additionally satisfying the conditional expressions above, a compact zoom lens can be realized that has excellent imaging performance and an angle of view that exceeds 100 degrees.

As described, the zoom lens according to the present invention is suitable for compact imaging devices and in particular, is ideal for single-lens reflex cameras of which wide angles of view are demanded.

The present invention enables the manufacturing cost of the optical system to be reduced by disposing a low cost spherical lens farthest on the object side and by forming lenses of small diameters (not the large diameter lens disposed farthest on the object side) to be aspheric. In addition, although an ultra wide angle exceeding 100 degrees is achieved, both maintenance of imaging performance and size reductions with respect to a diameter dimension of the first lens section can also be achieved.

Further, the present invention enables reductions in the weight of the focusing group since focusing can be performed by moving the front group alone.

The present invention also enables reductions in the weight of the focusing group since focusing can be performed by moving the intermediate group alone.

The present invention enables the zoom lens to be realized further having a camera-shake correction function.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2011-183026 filed in Japan on Aug. 24, 2011.

What is claimed is:

1. A zoom lens comprising sequentially from an object side, a first lens section having a negative refractive power, and a second lens section formed by multiple lens groups and having an overall refractive power that is positive, wherein
the first lens section comprises multiple lenses including sequentially from the object side, a first lens that is a spherical lens having a negative refractive power and a second lens that is an aspheric lens having a negative refractive power,
the second lens section is configured to include at least one aspheric lens having a negative refractive power,
zooming from a wide angle edge to a telephoto edge is performed by varying an interval between the first lens section and the second lens section, or an interval between the first lens section and the second lens section and intervals between the lens groups comprising the second lens section,
focusing from infinity to a minimum object distance is performed by moving any one of the lens groups comprising the second lens section,
a conditional expression (1) −8.0≤F12/D23≤−1.0 is satisfied, where, F12 is a focal length of the second lens, and with respect to the first lens section, D23 is a distance between an image-side surface of the second lens and an object-side surface of a lens disposed nearest an image plane, among the lenses comprising the first lens section, and a conditional expression (2) $2.5 \leq |100 \times \Delta1/\phi1| \leq 10.0$ is satisfied, where, $\phi1$ is a maximum effective diameter of an image-side surface of the second lens, and $\Delta1$ is a difference of a perimeter edge thickness of an aspheric surface and a perimeter edge thickness of a paraxial spherical surface, on a perimeter of an area demarcated by the maximum effective diameter $\phi1$ of the image-side surface of the second lens.

2. The zoom lens according to claim 1, wherein a conditional expression (3) $-20.0 \leq (Fw \times F\mathbf{12})/(D\mathbf{23})^2 \leq -1.0$ is satisfied, where, Fw is focal length of the optical system overall at the wide angle edge.

3. The zoom lens according to claim 1, wherein a conditional expression (4) $3.0 \leq 100 \times |(\Delta1/\phi1) - (\Delta2/\phi2)| \leq 12.0$ is satisfied, where, $\phi2$ is a maximum effective diameter of an image-side surface of the aspheric lens included in the second lens section and having a negative refractive power, and $\Delta2$ is a difference of a perimeter edge thickness of an aspheric surface and a perimeter edge thickness of a paraxial spherical surface, on a perimeter of an area demarcated by the maximum effective diameter $\phi2$ of the image-side surface of the aspheric lens included in the second lens section and having a negative refractive power.

4. The zoom lens according to claim 1, wherein the second lens section includes sequentially from the object side, a front group having a positive refractive power and a rear group having a positive refractive power, and the focusing from infinity to the minimum object distance is performed by moving the front group in a direction along an optical axis.

5. The zoom lens according to claim 1, wherein the second lens section includes sequentially from the object side, a front group having a positive refractive power, an intermediate group having a positive refractive power, and a rear group having a positive or a negative refractive power, and the focusing from infinity to the minimum object distance is performed by moving the intermediate group in a direction along an optical axis.

6. The zoom lens according to claim 1, wherein the second lens section includes sequentially from the object side, a front group having a positive refractive power, an intermediate group having a positive refractive power, and a rear group having a positive or a negative refractive power, the focusing from infinity to the minimum object distance is performed by moving the intermediate group in a direction along an optical axis, and camera-shake correction is performed by moving a lens included in the front group, in a direction substantially orthogonal to the optical axis.

7. The zoom lens according to claim 1, wherein the first lens section includes sequentially from the object side, a spherical lens having a negative refractive power and a meniscal-shape where a concave surface faces toward an image plane, an aspheric lens having a negative refractive power and a concave surface facing toward the image plane, and a lens having a positive refractive power.

8. The zoom lens according to claim 1, wherein the aspheric lens included in the second lens section and having a negative refractive power is disposed nearest the image plane among the lenses of the second lens section.

* * * * *